(12) United States Patent
Omura

(10) Patent No.: US 10,111,414 B2
(45) Date of Patent: Oct. 30, 2018

(54) FISHING LINE GUIDE, REEL SEAT AND FISHING ROD INCLUDING THE SAME

(71) Applicant: Fuji Kogyo Co., Ltd., Shizuoka-shi (JP)

(72) Inventor: Kazuhito Omura, Shizuoka (JP)

(73) Assignee: FUJI KOGYO CO., LTD., Shizuoka-shi (JP)

( * ) Notice: Subject to any disclaimer, the term of this patent is extended or adjusted under 35 U.S.C. 154(b) by 0 days.

(21) Appl. No.: 15/418,085

(22) Filed: Jan. 27, 2017

(65) Prior Publication Data
US 2017/0135330 A1    May 18, 2017

Related U.S. Application Data

(62) Division of application No. 14/889,307, filed as application No. PCT/JP2014/060924 on Apr. 17, 2014, now Pat. No. 9,591,836.

(30) Foreign Application Priority Data

Jul. 23, 2013 (KR) .......................... 10-2013-0086948

(51) Int. Cl.
*A01K 87/06* (2006.01)
*A01K 87/04* (2006.01)

(52) U.S. Cl.
CPC .............. *A01K 87/06* (2013.01); *A01K 87/04* (2013.01)

(58) Field of Classification Search
CPC ....................................................... A01K 87/06
See application file for complete search history.

(56) References Cited

U.S. PATENT DOCUMENTS 2,612,714 A * 10/1952 Coleman ................ A01K 87/06
43/22
2,630,647 A * 3/1953 Phillipson .............. A01K 87/06
43/22
(Continued)

FOREIGN PATENT DOCUMENTS

CN        102232374       11/2011
CN        202184058        4/2012
(Continued)

OTHER PUBLICATIONS

International Search Report dated Jul. 15, 2014 for PCT/JP2014/060924 filed on Apr. 17, 2014.
(Continued)

*Primary Examiner* — Christopher P Ellis
(74) *Attorney, Agent, or Firm* — Oblon, McClelland, Maier & Neustadt, L.L.P.

(57) ABSTRACT

A fishing line guide includes an attachment portion, a support leg frame, a support leg portion and a guide ring portion. The support leg frame extends from a base end of the attachment portion and is integrally formed with the attachment portion. The attachment portion and the support leg frame are made of a metallic material. The support leg portion extends from the base end of the attachment portion and is composited with the support leg frame throughout the overall length of the support leg frame. The guide ring portion is located at a tip end of the support leg portion. A fishing line passes through the guide ring portion. The support leg portion and the guide ring portion are partially or wholly made of a plastic material. A sectional area of the support leg frame gradually decreases toward the tip end of the support leg frame.

8 Claims, 24 Drawing Sheets

(56) References Cited

U.S. PATENT DOCUMENTS

| | | | |
|---|---|---|---|
| 4,011,680 A | 3/1977 | Rienzo, Sr. | |
| 4,187,633 A * | 2/1980 | Ohmura | A01K 87/06 43/22 |
| 4,616,438 A | 10/1986 | Ohmura | |
| 4,682,439 A | 7/1987 | Inoue | |
| 4,693,029 A * | 9/1987 | Yamamoto | A01K 87/06 43/22 |
| 4,726,139 A * | 2/1988 | Tokuda | A01K 87/06 43/22 |
| 5,177,892 A | 1/1993 | Ohmura | |
| 5,311,695 A | 5/1994 | Yasui | |
| D395,695 S | 6/1998 | Ohmura | |
| 6,378,240 B1 | 4/2002 | Ohmura | |
| 8,365,458 B2 | 2/2013 | Omura | |
| 8,813,415 B2 | 8/2014 | Akiba et al. | |
| 9,258,987 B1 * | 2/2016 | Vigeant | A01K 87/06 |
| 2006/0283073 A1 | 12/2006 | Omura | |
| 2010/0263257 A1 | 10/2010 | Akiba | |
| 2012/0060403 A1 | 3/2012 | Lopresti | |
| 2015/0272099 A1 * | 10/2015 | Oikawa | A01K 87/06 43/22 |
| 2015/0296761 A1 | 10/2015 | Sugaya et al. | |

FOREIGN PATENT DOCUMENTS

| | | |
|---|---|---|
| CN | 103039413 | 4/2013 |
| JP | 5-002674 U | 1/1993 |
| JP | 2000-139282 A | 5/2000 |
| JP | 2006-141341 A | 6/2006 |
| JP | 2010-075167 A | 4/2010 |
| JP | 2010-148523 A | 7/2010 |
| JP | 2011-211947 A | 10/2011 |
| JP | 2012-075363 A | 4/2012 |
| JP | 2012-110287 A | 6/2012 |
| JP | 5606295 | 10/2014 |
| KR | 20-0302033 Y1 | 1/2003 |
| KR | 20-0366928 Y1 | 11/2004 |
| KR | 10-2011-0109999 A | 10/2011 |
| KR | 10-1132437 B1 | 3/2012 |

OTHER PUBLICATIONS

Combined Chinese Office Action and Search Report dated Jun. 7, 2016 in Patent Application No. 201480034295.2 (with English translation of categories of cited documents).

* cited by examiner

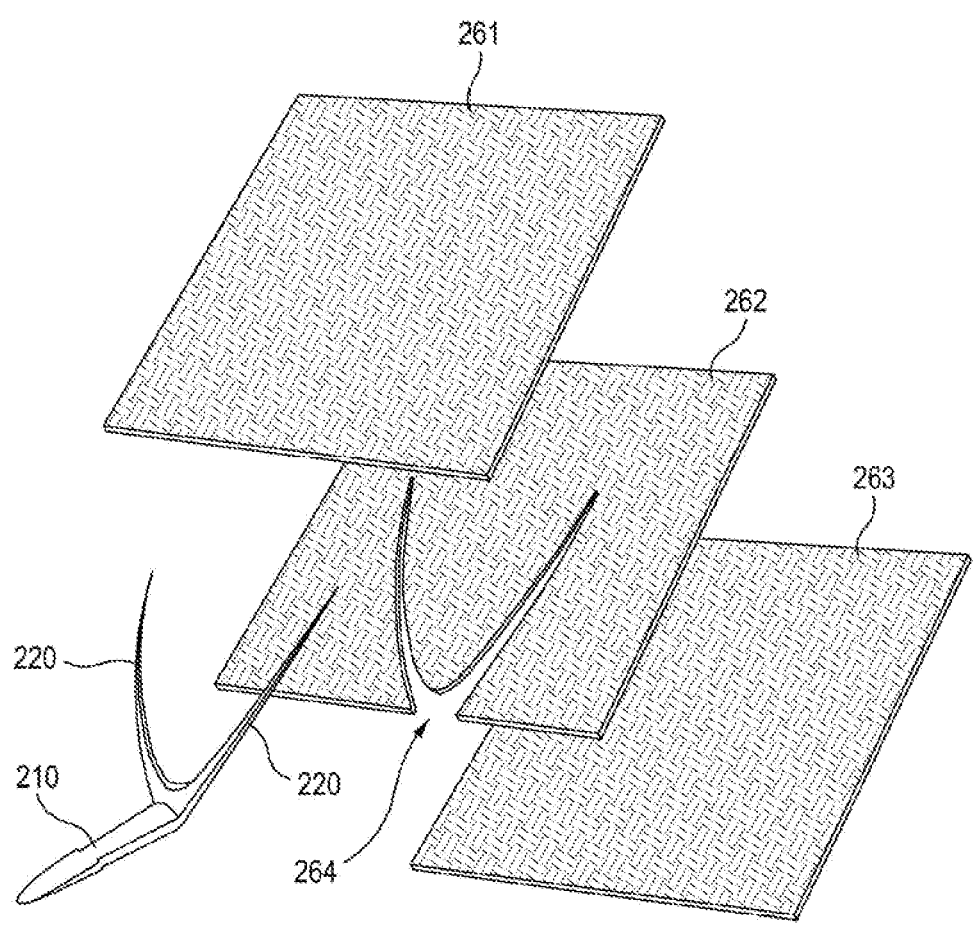

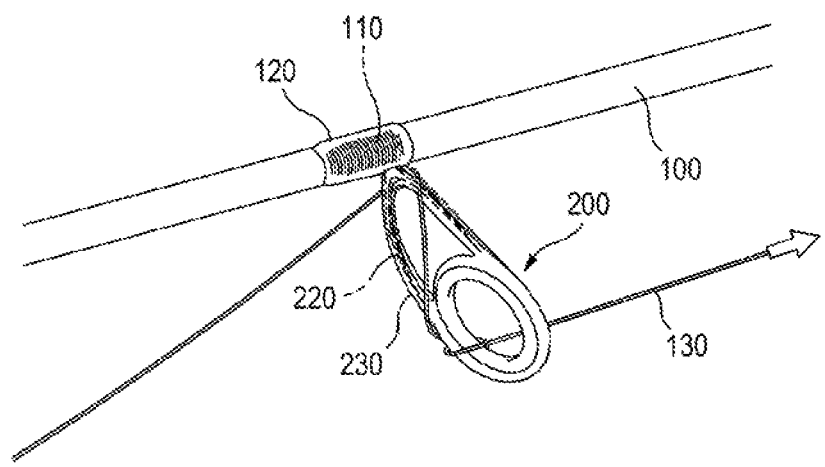
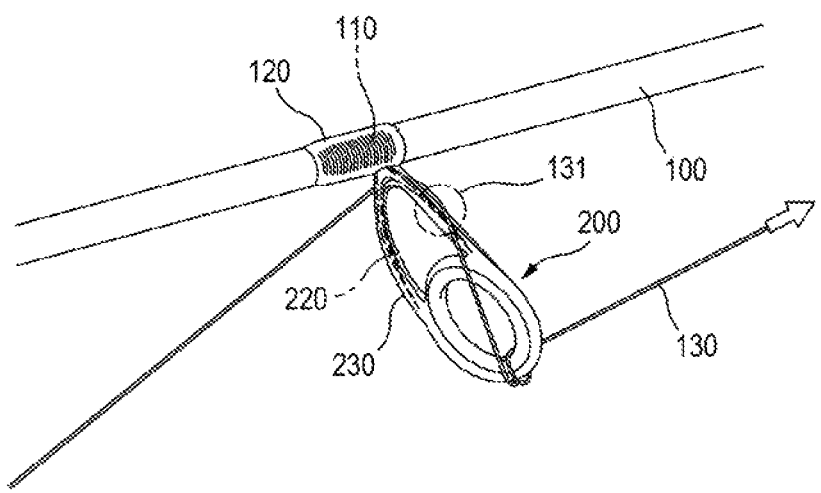

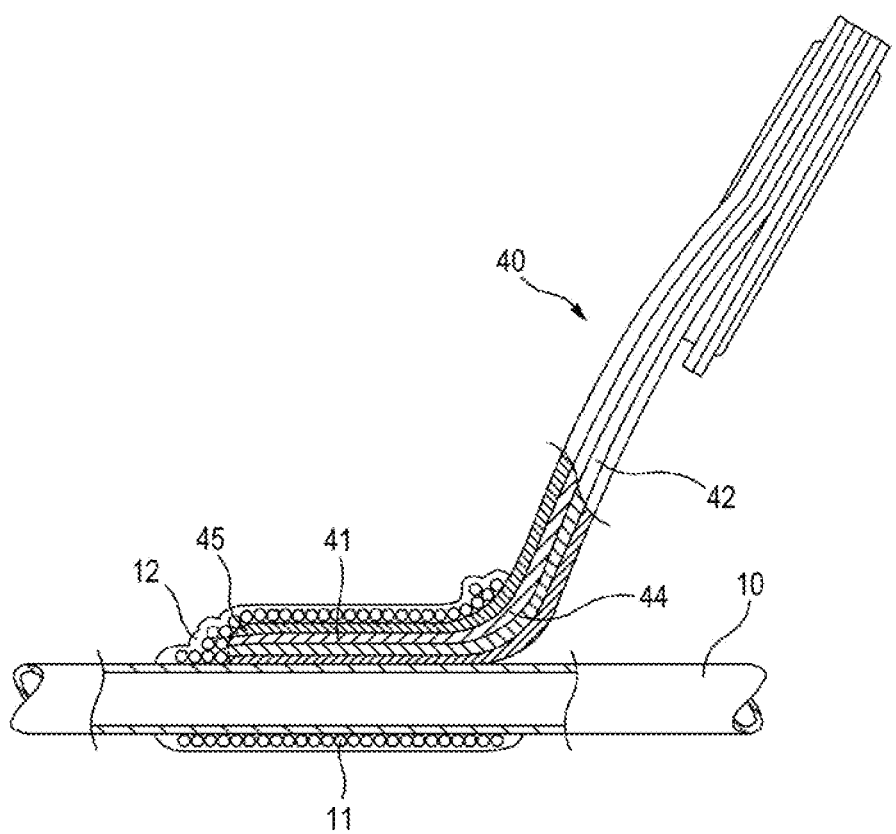

FISHING LINE GUIDE, REEL SEAT AND FISHING ROD INCLUDING THE SAME

CROSS-REFERENCE TO RELATED APPLICATIONS

This application is a divisional application of U.S. patent application Ser. No. 14/889,307, filed Nov. 5, 2015, which is a 35 U.S.C. § 371 national stage filing of International Application No. PCT/JP2014/060924, filed on Apr. 17, 2014, which claims the benefit of Korean Patent Application No. 2013-0086948, filed on Jul. 23, 2013, the entire contents of both of which are incorporated by reference in their entireties.

TECHNICAL FIELD

The present invention relates to a part attached to a fishing rod and, more particularly, to a fishing rod part such as a fishing line guide, a reel seat, etc. Further, the present invention relates to a fishing rod having such a fishing rod part.

BACKGROUND

A part for guiding a fishing line, which is called a fishing line guide, or a part for reeling in and reeling out a fishing line, which is called a reel, is attached to a fishing rod. The fishing line guide has an attachment portion which contacts the outer peripheral surface of the fishing rod. The fishing line guide is attached to the fishing rod by bringing the attachment portion into contact with the fishing rod and winding a winding thread around the attachment portion to fix the attachment portion to the fishing rod. The reel can be mounted on a reel seat having an attachment portion which contacts the outer peripheral surface of the fishing rod. The reel seat is attached to the fishing rod by bringing the attachment portion of the reel seat into contact with the fishing rod and winding a winding thread around the attachment portion to fix the attachment portion to the fishing rod.

By way of an example of the aforementioned fishing rod part, Korean Utility Model Registration Publication No. 20-0366928 (Patent Document 1) discloses a fishing line guide for guiding a fishing line. By way of another example of the aforementioned fishing rod part, Korean Utility Model Registration Publication No. 20-0302033 (Patent Document 2) discloses a reel seat for mounting a reel for reeling in and reeling out a fishing line.

Patent Document 1: Korean Utility Model Registration Publication No. 20-0366928
Patent Document 2: Korean Utility Model Registration Publication No. 20-0302033

SUMMARY

A fishing line guide is a part through which a fishing line passes. The fishing line guide distributes and transmits a load applied to a fishing line to a fishing rod. Further, when a fishing rig is cast, the fishing line guide guides a fishing line reeled out from a reel. As to design factors for a fishing line guide, it may be considered the following: a structural strength; weight reduction; a shape for fixation between a fishing line guide and a winding thread for attachment to a fishing rod; a shape for not causing the fishing line to be caught; and so forth.

To sufficiently ensure the strength of the fishing line guide, the fishing line guide has been made of a metallic material. FIG. 23A illustrates that a fishing line guide wholly made of a metallic material is attached to a fishing rod. A fishing line guide 20 of a prior art shown in FIG. 23A has an attachment portion 21 which contacts a fishing rod 10, a support leg portion 22 which extends from the attachment portion 21, and a guide ring portion 23 which is formed at a tip end of the support leg portion 22 and through which a fishing line passes. A winding thread 11 is wound throughout the overall length of the attachment portion 21 and a coating layer 12 is formed by applying an adhesive on a portion around which the winding thread 11 is wound, thereby attaching the fishing line guide 20 to the fishing rod 10.

Regarding winding the winding thread 11, it is important to closely wind the winding thread 11 in order to ensure the fine appearance of a portion in the fishing rod 10 around which the winding thread is wound and to ensure a fixation strength under which the attachment portion 21 is not detached from the fishing rod. For this reason, it is required that the attachment portion 21, around which the winding thread 11 is wound, has no step portion and a tip end portion of the attachment portion 21 is formed smooth and thin. Further, in a process of attaching the attachment portion to the fishing rod, it is important that a subsequently-wound winding thread is not wound on the previously-wound winding thread 11. In other words, it is important that the winding thread 11 is not wound in two or more layers through a single process. This is because, if an adhesive is applied on a portion at which the winding thread 11 is wound in two or more layers, then step portions are created in the cured coating layer 12. This is also because that such step portions may impair the fine appearance and may cause the fishing line to be caught during fishing.

To improve casting and sensitivity of fishing, the weight reduction of a fishing rod is required and thus studies related thereto have been made in the art. In addition, studies on weight reduction of the parts to be attached to a fishing rod have been made in the art. The fishing line guide 20 shown in FIG. 23A is made of metal and therefore has a limit in achieving the weight reduction. There exists a fishing line guide using a plastic material lighter than metal (e.g., a fiber-reinforced plastic) as a material of a fishing line guide. FIG. 23B illustrates fishing line guide that is wholly made of a fiber-reinforced plastic.

The fishing line guide 30 shown in FIG. 23B has an attachment portion 31 and a support leg portion 32 which are thicker than those of the metallic fishing line guide 20 shown in FIG. 23A. This is because a connection portion 34 between the attachment portion 31 and the support leg portion 32, to which the heaviest load is applied, is formed thick with a large radius of curvature due to the elastic modulus and strength of a plastic material less than those of a metallic material in order to reinforce the elastic modulus and the strength required by the fishing line guide. If the winding thread 11 is wound around the connection portion 34 formed thick with a large radius of curvature, then the winding thread 11 is prone to be wound in two or more layers because a subsequently-wound winding thread is placed on a previously-wound winding thread. This creates the aforementioned step portion in the coating layer 12. Further, since the fishing line guide 30 shown in FIG. 23B has difficulties in making a tip end portion of the attachment portion 31 smooth and thin, it has the attachment portion 31 thicker than that of the metallic fishing line guide 20. This is because the molded attachment portion tends to have defects due to the phenomenon that a molten plastic material is not sufficiently injected to a portion of a mold which forms the tip end portion of the attachment portion, and because burrs tends to create due to poor machining precision of the mold. The thick attachment portion 31 becomes a big protrusion portion of the fishing rod 10. Thus, the thick attachment portion impairs the fine appearance although the winding thread is wound around the attachment portion and is then coated.

By way of do alternative to the metallic fishing line guide, it may be considered to manufacture a fishing line guide by prepreg laminate molding, i.e. laminate molding of resin pre-impregnated material. FIG. 23C illustrates a fishing guide 40 that is wholly made of a fiber-reinforced plastic by prepreg laminate molding. In the fishing line guide 40 manufactured by prepreg laminate molding, a tip end portion 45 of an attachment portion 41 cannot become thinner toward its tip end but is designed to be thick. This is because, if the tip end portion 45 of the attachment portion 41 is cut to be thin, then the laminated layers tends to delaminate or the fibers tend to be nappy. Thus, the winding thread 11 is wound in several layers in the front of the thick tip end portion 45 of the attachment portion 41. Further, a connection portion 44 between the attachment portion 41 and the support leg portion 42 is formed thick with a large radius of curvature. This is because of the problem that the fibers are broken when the prepreg laminate is heavily bent. Accordingly, even in this case, the winding thread 11 is wound in two or more layers and the aforementioned step portion of coating layer 12 is created accordingly.

Among the above-described fishing lane guides of the prior art, the fishing line guide, which is made of a plastic material such as a fiber-reinforced plastic for the weight reduction of the fishing line guide, inevitably has the thick connection portion of the tip end portion. Thus, they cannot achieve a thin and smooth tip end of the attachment portion and close winding of the winding thread. A such, the fishing line guides of the prior art fail to make the design factors compatible such as the pursuit of weight reduction, the satisfaction of required strength, the securement of a fine appearance and the prevention of creation of a step portion.

The present invention is made to solve the aforementioned problems of the prior art. It is an objective of the present invention to provide a fishing rod part, which is light while ensuring a required strength, which improves a fine appearance of the winding thread-wound portion, and which does not create a step portion causing a fishing line to be caught, and to provide a fishing rod including such a fishing rod part.

One aspect of the present invention provides a fishing line guide that is attached to a fishing rod and guides a fishing line. In an exemplary embodiment, the fishing line guide includes an attachment portion, a support leg frame, a support leg portion and a guide ring portion. The attachment portion has a tip end and a base end contacts the fishing rod. A winding thread is wound around the attachment portion. The support leg frame extends from the base end of the attachment portion and is integrally formed with the attachment portion. The attachment portion and the support leg frame are made of a metallic material. The support leg portion extends from the base end of the attachment portion. The support leg portion is composited with the support lea frame throughout at least the overall length of the support leg frame and is smoothly formed without a step portion in a longitudinal direction. The guide ring portion is located at a tip end of the support leg portion. A fishing line passes through the guide ring portion. The support leg portion and the guide ring portion are partially or wholly made of a plastic material. A tip end of the support leg frame is located below the tip end of the support leg portion and does not adjoin the guide ring portion. A sectional area of at least a portion of the support leg frame gradually decreases toward the tip end of the support frame.

In an embodiment, the attachment portion has a lower surface contacting the fishing rod and an upper surface opposite to the lower surface and the support leg portion is composited with the support leg frame so as to contact the upper surface. In such an embodiment, a length or area ratio of a portion of the upper surface, which does not contact the support leg portion, to the entirety of the upper surface may be 80% or more.

In an embodiment, the attachment portion has a lower surface contacting the fishing rod and an upper surface opposite to the lower surface. The support leg portion is composited with the support leg frame with a gap between the support leg portion and the upper surface. In such an embodiment, a size of the gap is 2 mm or less. Further, at a surface of the support leg frame which is opposite to a surface of the support leg frame with the gap, at least a portion of the support leg portion is in contact with the fishing rod.

In an embodiment, a range of cross-sectional composition between the support leg frame and the support leg, portion may be 50% to 100% of a cross-sectional periphery of the support leg frame.

In an embodiment, the support leg frame comprises a pair of support leg frames extending from the base end of the attachment portion. Respective base portions of the pair of the support leg frames, which are connected to the base end of the attachment portion, may be integrally formed via a common portion.

In an embodiment, the support leg frame has an intermediate having a constant sectional area. A sectional area of the support leg frame gradually decreases from the intermediate portion toward the tip end of the support leg frame.

In an embodiment, the support leg frame has at least one concave portion. In an embodiment, the metallic material of which the attachment portion and the support leg frame are made comprises one or more of titanium, aluminum, magnesium, titanium alloy, aluminum alloy, magnesium alloy, stainless steel and shape memory alloy. The plastic material of which the support leg portion and the guide ring portion are partially or wholly made comprises a thermoplastic fiber-reinforced plastic. The support leg portion and the guide ring portion are formed by insert molding.

In an embodiment, the metallic material of which the attachment portion and the support leg frame are made comprises one or more of titanium, aluminum, magnesium, titanium alloy, aluminum alloy, magnesium alloy, stainless steel and shape memory alloy. The support leg portion and the guide ring portion are formed by laminate molding of resin pre-impregnated material.

Another aspect of the present invention related to a reel seat attached to a fishing rod for mounting a reel thereon. In an exemplary embodiment, the reel seat includes an attachment portion, a support leg frame and a seat body. The attachment portion has a tip end and a base end and contacts the fishing rod. A winding thread is wound around the attachment portion. The support leg frame extends from the base end of the attachment portion and is integrally formed with the attachment portion. The attachment portion and the support leg frame are made of a metallic material. The seat body is partially or wholly made of a plastic material. A reel is mounted on the seat body. The seat body extends from the base end of the attachment portion and is composited with the support leg frame throughout at least the overall length of the support leg frame. A sectional area of at least a portion of the support leg frame gradually decreases toward a tip end of the support leg frame.

A further aspect of the present invention provides a fishing rod including the above-described fishing line guide or the above-described reel seat. The fishing rod according to an embodiment includes at least one above-described fishing line guide. Further, the fishing rod according to an embodiment includes the above-described reel seat. Furthermore, the fishing rod according to an embodiment includes the above-described fishing line guide and reel seat.

In the fishing line guide and the reel seat according to the embodiments, the attachment portion and the support leg frame, which extends from the attachment portion and is composited with the support leg portion or the reel seat body, are made of a metallic material and are integrally formed. In contrast, the support leg portion or the reel seat body is partially or wholly made of a plastic material and is composited up to the connection portion between the attachment portion and the support leg frame. Accordingly, the fishing line guide and the reel seat are lighter than parts of the prior art which are wholly made of a metallic material. Further, the attachment portion can be formed thin. Also, the connection portion between the attachment portion and the support leg frame is prevented from being damaged or broken. The fine appearance is not impaired when the winding thread is wound around the attachment portion. No step portion is created.

Further, since the support leg portion comprised with the support leg frame throughout at least the overall length of the support leg frame, the support leg portion and the support leg frame are smoothly formed without a step portion in the longitudinal direction. Thus, although the fishing line is wound around the guide ring portion of the fishing line guide during casting; and thus the entanglement of the fishing line occurs, the folded portion of the fishing line formed around the fishing line guide is smoothly moved along the support leg portion, thereby easily detangling the entanglement of the fishing line.

The tip end of the support leg frame is located below the tip end of the support leg portion and does not adjoin the guide ring portion. Thus, the tip end portion of the support leg portion and the guide ring portion, both of which are located above the fishing rod, become light and the torsional moment acting about the axis of the fishing rod during casting is relieved. This provides an effect of performing accurate and stable casting.

When landing a fish, a tension is applied to the fishing line and a load is transmitted to the guide ring portion. Under the moment of force generated by such a load, it is preferable that the strength balance of the support leg portion gradually decreases toward the guide ring portion. Since the support leg frame has a sectional area gradually decreasing toward the tip end, the support leg portion can be formed light and thin while ensuring the strength balance of the whole of the support leg portion. Further, the support leg frame having the above-described configuration is smoothly composited with the support leg portion during the insert molding, thus achieving superior part workability. Further, the tip end portion of the support leg frame has low rigidity and superior flexibility, thus preventing a separation between the support leg frame and the support leg portion, which are composited together, when the support leg portion elastically deforms.

Accordingly, the present invention can provide a fishing rod part, which is light while ensuring a required strength, which improves a fine appearance of the winding thread-wound portion, and which does not create a step portion causing a fishing line to be caught, and a fishing rod including such a fishing rod part.

BRIEF DESCRIPTION OF THE DRAWINGS

FIG. 16A is a first view schematically showing a laminate molding method of resin pre-impregnated materials for a fishing line guide according to one embodiment.

FIG. 17B is a second view showing an example of a fishing line guide according to one embodiment which has a support leg portion structure allowing the fishing line entanglement in the fishing line guide to be disentangled during casting.

FIG. 17C is a third view showing an example of a fishing line guide according to one embodiment which has a support leg portion structure allowing the fishing line entanglement in the fishing line guide to be disentangled during casting.

FIG. 23C third longitudinal sectional view showing a fishing line guide of a prior art.

DETAILED DESCRIPTION

Figure 1:
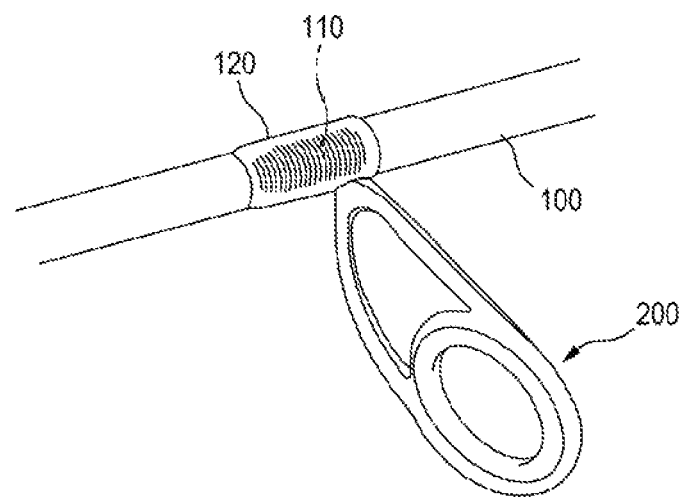
FIG. 1 is a perspective view showing a fishing rod to which a fishing line guide according to one embodiment of the present invention is attached.

Descriptions are made as to embodiments of a fishing line guide, a reel seat and a fishing rod including the same with reference to the accompanying drawings. Like reference numerals in the drawings denote like or corresponding elements or parts.

The directional term "frontward," "front" or the like as used herein means a direction directed toward a tip of a fishing rod, while the directional term "rearward," "rear" or the like means a direction directed toward a butt of a fishing rod. Further, as used herein, the directional term "upward," "upper" or the like is based on a direction in which a guide ring portion is positioned relative to an attachment portion, while the directional term "downward," "lower" or the like means a direction opposite to the upward or upper direction.

Embodiments disclosed herein are related to a fishing line guide and a reel seat which are examples of a part for a fishing rod. The fishing line guide is attached to a fishing rod and guides a fishing line. The reel seat is attached to a fishing rod and is used for mounting a reel. The fishing rod part to which the principle of the present invention is applied is not limited to the aforementioned fishing line guide and reel seat. The fishing rod part includes any part which is configured such that its attachment portion is attached to a rod body of a fishing rod by means of a winding thread.

FIG. 1 shows a fishing rod to which a fishing rod part of the present invention is attached. The fishing rod 100 may have a structure wherein a plurality of thin and long cylindrical rods are consecutively joined in a put-in manner or a telescopic manner. Alternatively, the fishing rod 100 may comprise a single rod. FIG. 1 shows a portion of the fishing rod 100. To attach the fishing rod part to the fishing rod, a winding thread 110 is wound around a portion of the fishing rod part to be attached to the fishing rod. The winding thread 110 comprises, but is not limited to, a nylon material or a silk material. To fix the winding thread 110, to prevent unwinding of the winding thread 110, and to fill in the winding thread 110, a transparent, translucent or opaque adhesive is applied to the whole of the portion around which the winding thread 110 is wound, then forming a coating layer 120 that covers the portion around which the winding thread 110 is wound. Said adhesive comprises, but is not limited to, an epoxy-based adhesive, a urethane based adhesive and a UV-curable adhesive or the like.

The fishing rod 100 shown in FIG. 1 includes, at a portion thereof, a fishing line guide 200 which is an example of the fishing rod part. The fishing rod 100 may include one or a plurality of fishing line guides 200. The fishing line guide 200 is attached to the fishing rod 100 by bringing its attachment portion into contact with the fishing rod 100 and then closely winding the winding thread 110 around the attachment portion. After the fishing line guide 200 is attached, the adhesive is applied to the portion around which the winding thread 110 is wound and thus the coating layer 120 is formed. Due to the coating layer 120, the portion around which the winding thread 110 is wound has a smooth surface.

Figure 2:
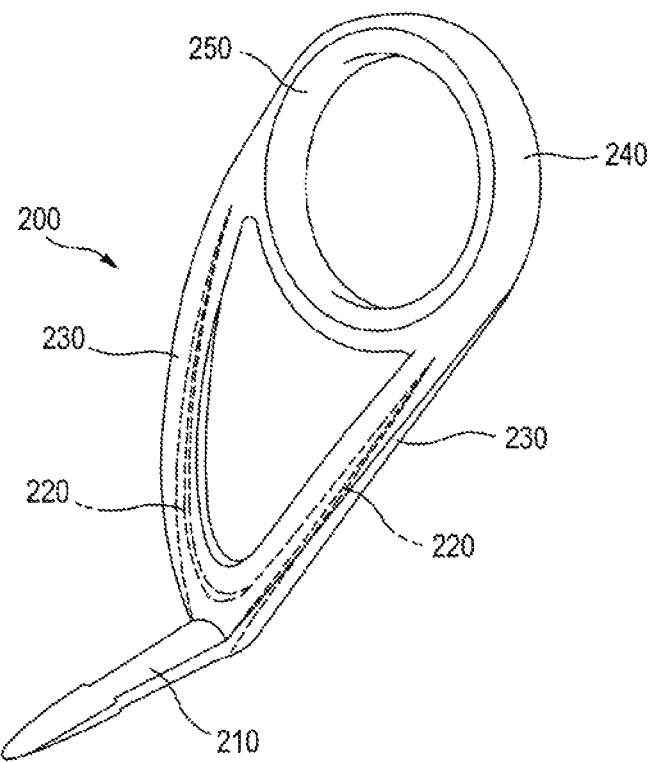
FIG. 2 is a perspective view showing a fishing line guide according to one embodiment of the present invention.
Figure 3:
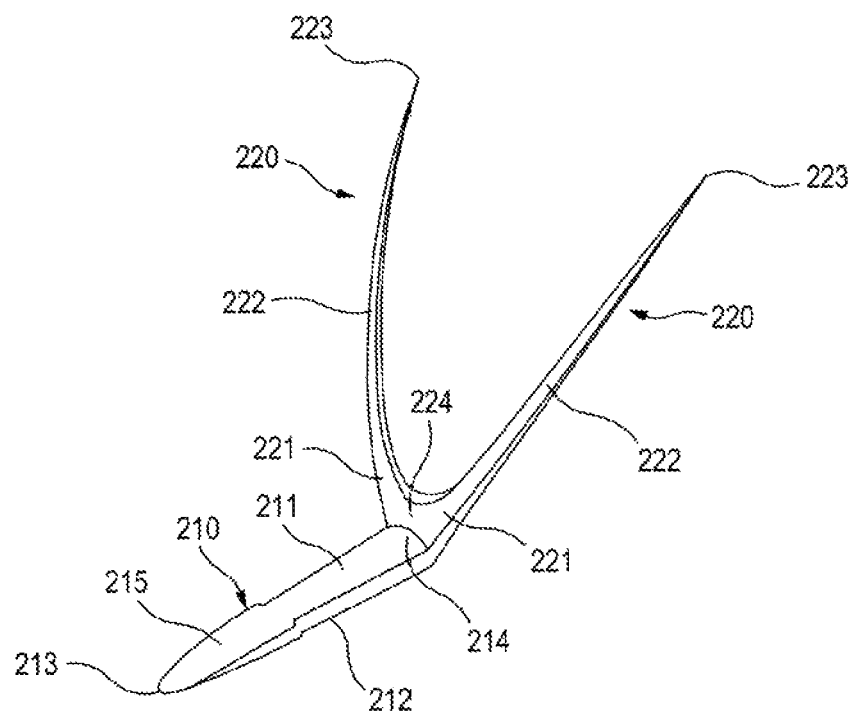
FIG. 3 is a perspective view showing an attachment portion and support leg frames of the fishing line guide shown in FIG. 2.
Figure 4A:
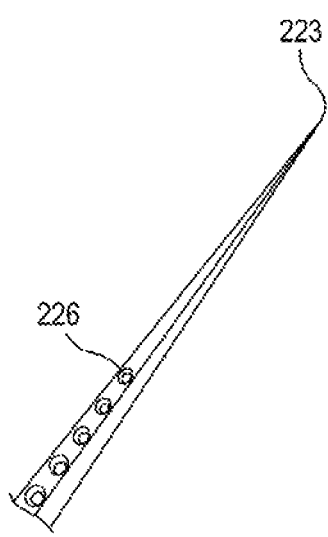
FIG. 4A is a first view showing various examples of a concave portion formed in the vicinity of a tip end portion of the support leg frame.
Figure 4B:
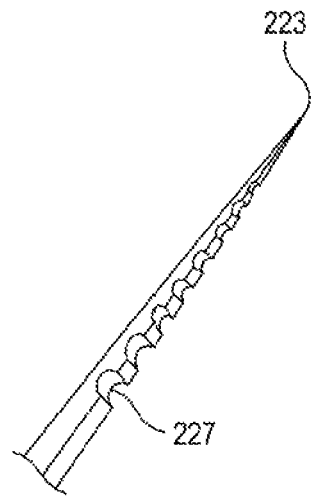
FIG. 4B is a second view showing various examples of a concave portion formed in the vicinity of a tip end portion of the support leg frame.
Figure 4C:
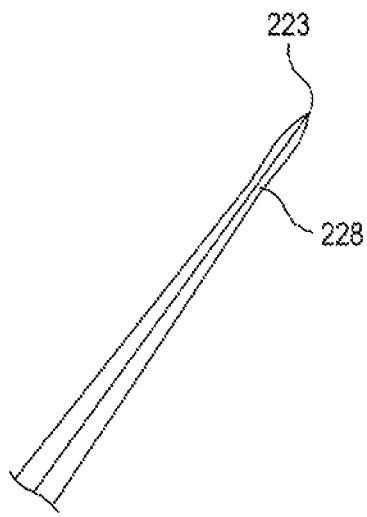
FIG. 4C is a third view showing various examples of a concave portion formed in the vicinity of a tip end portion of the support leg frame.
Figure 4D:
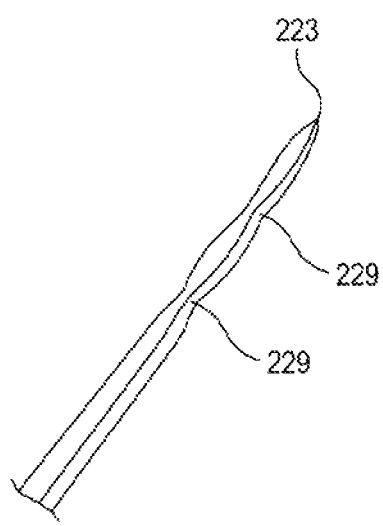
FIG. 4D is a fourth view showing various examples of a concave portion formed in the vicinity of a tip end portion of the support leg frame.

FIGS. 2 and 3 show the fishing line guide 200 in detail. The fishing line guide 200 according to one embodiment includes the following: an attachment portion 210 attached to the fishing rod 100; a support leg frame 220 extending from a base end of the attachment portion 210 and integrated with the attachment portion 210; a support leg portion 230 extending from the base end of the attachment portion 210, the support leg portion 230 being composited with the support leg frame 220 throughout at least the overall length of the support leg frame 220 and formed smoothly without a step portion in a longitudinal direction thereof; a guide ring portion 240, through which a fishing line passes, located at a tip end of the support leg portion 230; and a hard ring 250 fitted to the guide ring portion 240 and thrilled in a circular or oval shape by ceramic, metal or the like.

The attachment portion 210 is a part that contacts the fishing rod 100 to attach the fishing line guide 200 to the fishing rod 100. The attachment portion 210 has a tip end 213 and a base end 214. The attachment portion 210 has a narrow and elongated shape as a whole and becomes thinner toward the tip end 213 when viewed from side. A lower surface 212 of the attachment portion 210 contacts an outer peripheral surface of the fishing rod 100. The lower surface 212 may be formed flat or may be formed concavely with a small curvature. A tip end portion 215 of the attachment portion 210 becomes thinner and narrower toward the tip end 213.

The support leg frame 220 extends from the base end 214, which is located opposite to the tip end 213 of the attachment portion 210. In this embodiment, the fishing line guide 200 has a pair of support leg frames 220 extending in a V-like shape from the base end 214 of the attachment portion 210. Alternatively, the pair of the support leg frames 220 may extend in a U-like shape from the base end 214 of the attachment portion 210. The attachment portion 210 and the support leg frames 220 are metallic and are integrated together. The metallic material for forming the integrated attachment portion 210 and support leg frames 220 comprises titanium, aluminum, magnesium, titanium alloy, aluminum alloy, magnesium alloy, stainless steel or shape memory alloy. The metallic material for forming the attachment portion 210 and the support leg frames 220 is not limited to the aforementioned materials, but may comprise any metal or its alloy which has high strength and superior thin formability.

A base portion 221 of each of the support leg frames 220 is connected to the base end 214 of the attachment portion 210. In this embodiment, the base portions 221 of the respective support leg frames 220 are integrally formed via a common portion 224. The overall length of the support leg frame 220 may be determined in view of the composition of the support leg frame and the support leg portion 230 and the position of the guide ring portion 240. The support leg frame 220 may have various cross-sectional shapes such as a circular shape, an elliptical shape, a triangular shape, a rectangular shape, a polygonal shape, etc. In the illustrated example, the support leg frame 220 has a rectangular cross-sectional shape.

The support leg frame 220 is formed such that the sectional area in its partial section or its whole section gradually decreases toward the tip end 223. Herein, that the sectional area of the support leg frame 220 gradually decreases toward the tip end includes the following case: where the longitudinal-sectional area of the support leg frame 220 in its partial or whole section gradually decreases toward the tip end 223; where the cross-sectional area of the support leg frame in its partial or whole section gradually decreases toward the tip end 223; or where the aforementioned two cases are applied together. The tip end of the support leg frame 220 is located below the tip end of the support leg portion 230 (below the interface between the support leg portion 230 and the guide ring portion 240) and does not adjoin the guide ring portion 240.

Referring to FIG. 3, the cross-sectional area of the support leg frame 220 is largest at the base portion 221 adjacent to the base end 214 of the attachment portion 210, while gradually decreasing toward the tip end 223 of the support leg frame 220. The tip end 223 of the support leg frame 220 is formed sharply or in an approximately spherical shape. Since the cross-sectional area of the support leg frame 220 gradually decreases toward the tip end 223, its rigidity becomes less toward the tip end 223. Accordingly, when the support leg frame 220 and the support leg portion 230 are molded together (for example, insert molding), the support leg frame 220 can be smoothly composited with the support leg portion 230, thereby achieving superior part workability. Alternatively, an intermediate portion 222 between the base portion 221 and the tip end 223 of the support leg frame 220 may have a constant cross-sectional area or a constant longitudinal-sectional area in the longitudinal direction. In this case, the cross-sectional area or the longitudinal-sectional area of the support leg frame 220 gradually decreases from the intermediate portion 222 toward the tip end 223.

Since the support leg frame 220 is made of a metallic material, the support leg frame 220 can be formed thin while ensuring the strength thereof. Thus, the support leg portion 230, which is composited with the support leg frame 220, can also have a reinforced strength and be formed thin and light.

Further, the support leg frame 220 has an element for firmly fixing the support leg frame 220 to the support leg portion 230 when the support frame is composited with the support leg portion 230. Said element may be embodied as a concave portion formed in the support leg frame 220. Specifically, the concave portion includes the following: a hole formed on a surface of the support leg frame 220; a cutout portion formed by roundly concavely cutting out a portion of the support leg frame 220; a neck portion at which the decreasing cross-sectional area of the support leg frame 220 increases again; or the like.

FIGS. 4A to 4D show various examples of the aforementioned concave portion. In the example shown in FIG. 4A, as an example of the concave portion, a plurality of 226 are formed in the vicinity of the tip end of the support leg frame 220 along the longitudinal direction thereof. In the example shown in FIG. 4B, as an example of the concave portion, a plurality of cutout portions 227 are formed along the longitudinal direction in the vicinity of the tip end of the support leg frame 220 by roundly concavely cutting out a portion of the support leg frame 220. In the example shown in FIG. 4C, as an example of the concave portion, one neck portion 228 is formed in the vicinity of the tip end 223. The cross-sectional area or the longitudinal sectional area of the support leg frame 220, which gradually decreases toward the tip end 223, increases at the neck portion 228. In the example shown in FIG. 4D, two neck portions 229 are formed as an example of the concave portion. The cross-sectional area or the longitudinal sectional area of the support leg frame 220, which gradually decreases toward the tip end 223, increases at the neck portion 229. Due to the aforementioned concave portion (i.e., the holes 226, the cutout portions 227, or the neck portions 228, 229), the material forming the support leg portion 230 fills in the concave portion during compositing the support leg frame 220 and the support leg portion 230. Thus, the support leg frame 220 can be firmly fixed to the support leg portion 230 in the vicinity of the tip end of the support leg frame 220.

When landing a fish, a tension is applied to a fishing line and a load is transmitted to the guide ring portion 240. The load is borne by the support leg portion 230. In the fishing line guide 200, under the moment of a force, the load applied from the fishing line may be concentrated on the interface between the attachment portion 210 and the support leg frame 220, i.e. the base portion 221 of the support leg frame 220 or the base end 214 of the attachment portion 210. However, since the attachment, portion 210 and the support leg frame 220, which are integrally formed, are made of a metallic material, deformation or breakage hardly occurs at the base portion 221 of the support leg frame 220 or the base end 214 of the attachment portion 210 on which the load is concentrated.

The support leg portion 230 is smoothly composited with the support leg frame 220 along the longitudinal direction throughout at least the overall length of the support leg frame 220. Herein, the term "at least" includes the following cases: where the support leg portion 230 is composited throughout the overall length of the support leg frame 220;

and where the support leg portion 230 has a length longer than the overall length of the support leg frame 220 and therefore has a portion that is not composited with the support leg frame 220 above the tip end of the support leg frame 220. Further, the term "composited" includes the following cases: where the support leg frame 220 is fully embedded in the support leg portion 230 such that the cross-sectional periphery of the support leg frame 220 is not exposed at all; and where the support leg frame 220 is embedded in the support leg portion 230 such that at least one longitudinal surface of the support leg frame 220 is exposed, i.e. such that a portion of the cross-sectional periphery of the support leg frame 220 is exposed.

In this embodiment, similar to the shape of the support leg frames 220, the support leg portions 230 extend from the base end 214 of the attachment portion 210 in a V-like shape. The guide ring portion 240 is located at the tip end of the support leg portion 230. The hard ring 250 made of a ceramic material is fitted to the guide ring portion 240.

The support leg portion 230 and the guide ring portion 240 are partially or wholly made of a plastic material. Said plastic material includes a thermoplastic fiber-reinforced plastic or other plastic having superior moldability.

Figure 5A:
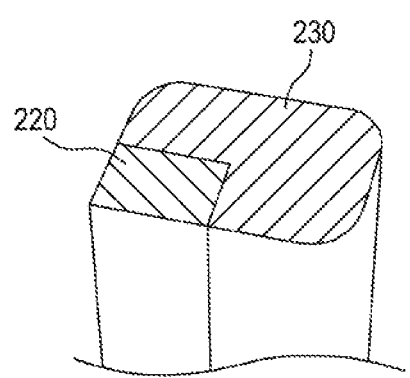
FIG. 5A is a first view showing a composition example of a support leg frame and a support leg portion by cross-section.
Figure 5B:
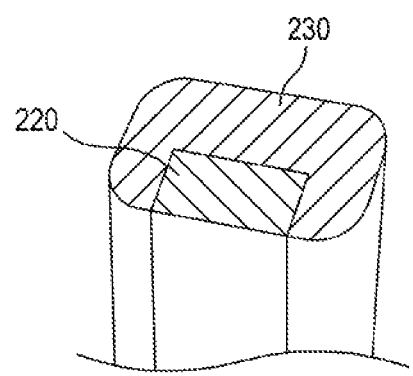
FIG. 5B is a second view showing a composition example, of a support leg frame and a support leg portion by cross-section.
Figure 5C:
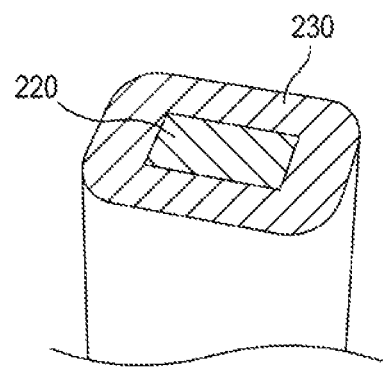
FIG. 5C is a third view showing a composition example of a support leg frame and a support leg portion by cross-section.

FIGS. 5A to 5C show the examples of the composition of the support leg portion 230 and the support leg frame 220 by a cross-sectional view. As shown in FIG. 5A, the support leg frame 220 may be embedded in the support leg portion 230 such that two surfaces of the support leg frame 220 are exposed. Thus, a half (50%) of the cross-sectional periphery of the support leg frame 220 is in contact with the support leg portion 230. As shown in FIG. 5B, the support leg frame 220 may be embedded in the support leg portion 230 such that one surface of the support leg frame 220 is exposed. As shown in FIG. 5C, the support leg frame 220 may be fully embedded in the support leg portion 230. Thus, the entirety (100%) of the cross-sectional periphery of the support leg frame 220 is in contact with the support leg portion 230. In other words, regarding the composition of the support leg frame 220 and the support leg portion 230, the range of the cross-sectional composition is 50% to 100% of the cross-sectional periphery of the support leg frame 220. As such, the support leg portion 230 is composited with the support leg frame 220 throughout the overall length of the support leg frame 220, thus not creating a step portion throughout the overall length of the support leg portion 230. Accordingly, as will be described below, the support leg portion does not hinder when the entanglement of the fishing line disentangles naturally during casting a fishing rig by swing a fishing rod.

The support leg portion 230 is composited with the support leg frame 220 up to the base portion 221 of the support leg frame 220 or up to the interface between the attachment portion 210 and the support leg frame 220. Thus, after winding the winding thread 110 around the attachment portion 210 and then making the coating thereon, no step portion is created between the fishing rod 100 and the support leg portion 230, thus not causing the fishing line to be caught.

Since the support leg frame 220 has a sectional area gradually decreasing toward the tip end 223 thereof, the rigidity of the support leg portion 230 becomes less toward the tip end 223 and the support leg portion 230 has superior flexibility accordingly. Further, when the support leg portion 230 is bent by an external force applied through the fishing line or a wind force the superior flexibility in the vicinity of the tip end 223 of the support leg frame 220 prevents a separation of the support leg frame 220 and the support leg portion 230.

With reference to FIGS. 6 to 9, descriptions are made as to composition examples of the support leg portion 230 in the vicinity of the base portion of the support leg frame 220 and winding examples of the winding thread 110 in conjunction with such composition examples.

Figure 6:
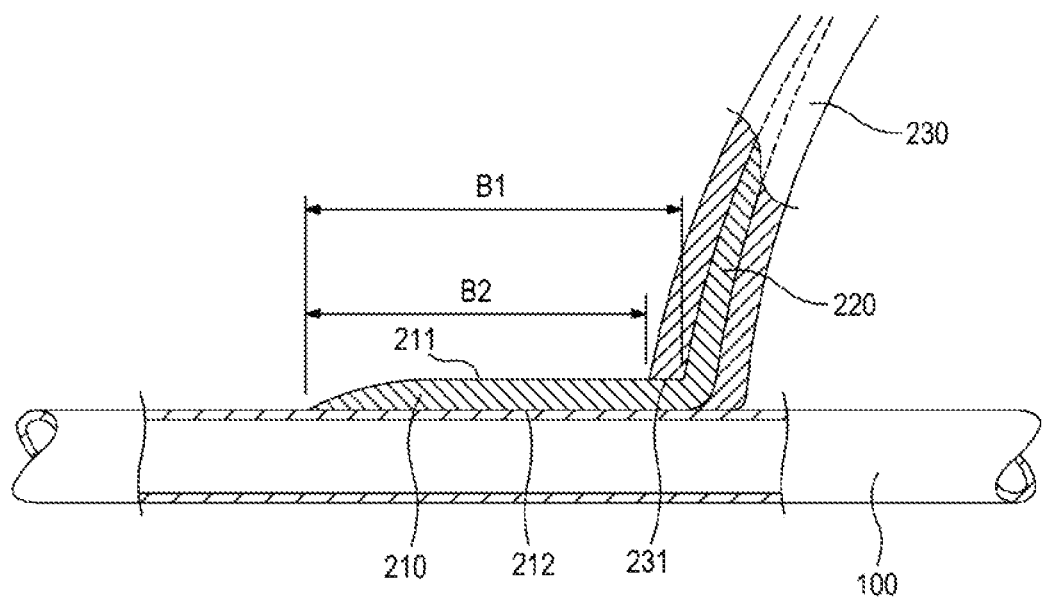
FIG. 6 is a longitudinal sectional view showing that a fishing line guide according to one embodiment of the present invention is in contact with a fishing rod.
Figure 7:
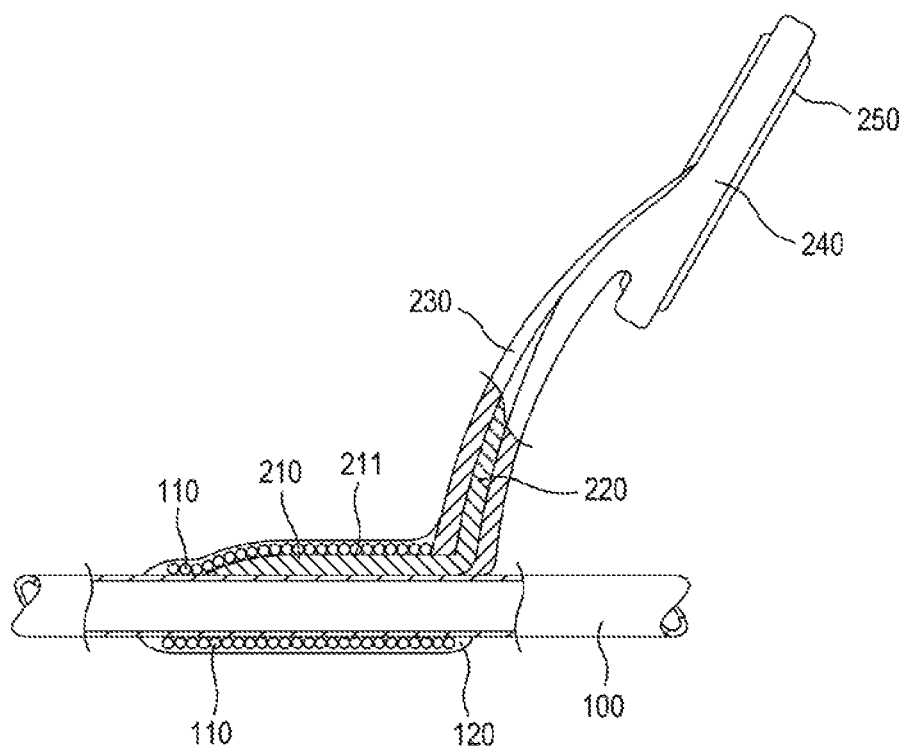
FIG. 7 is a longitudinal sectional view showing that a winding thread is wound around the fishing line guide shown in FIG. 6.

Referring to FIG. 6, the support leg portion 230 may be composited with the support leg frame 220 such that the support leg portion is in contact with the upper surface 211 of the attachment portion 210. In other words, the support leg portion 230 may be composited with the support leg frame 220 such that a lower end 231 of the support leg portion 230, which faces toward the upper surface 211 of the attachment portion 210, is in contact with the upper surface 211 of the attachment portion 210. Thus, the entire region (denoted by B1 in FIG. 6) of the upper surface 211 of the attachment portion 210 is divided into an exposed region (denoted by B2 in FIG. 6) and a region hidden by the support leg portion 230. In this embodiment, a ratio of the length of the region B2 of the upper surface 211 of the attachment portion 210, which is not hidden by the support leg portion 230 and is exposed, to the entire region B1 of the upper surface 211 (i.e., (B2/B1)×100) is 80% or more. In this regard, said ratio may be an area ratio of the region B2 of the upper surface 211, which is not hidden by the support leg portion 230 and is exposed, to the entire region B1 of the upper surface 211. If the exposure ratio of the exposed region B2 is less than 80%, then the amount of the winding thread 110 for the attachment portion 210 is reduced and therefore the required attachment strength cannot be achieved. FIG. 7 illustrates that the winding thread 110 is wound around the attachment portion 210 shown in FIG. 6.

Figure 8:
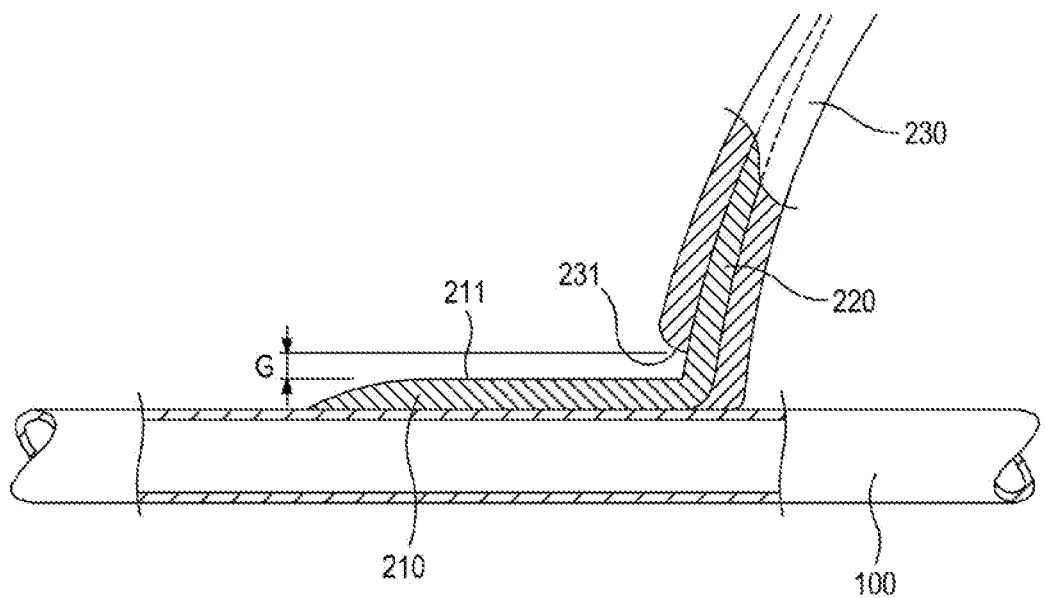
FIG. 8 is a longitudinal sectional view showing that a fishing line guide having a gap formed between a lower end of a support leg portion and an upper surface is in contact with a fishing rod.

Referring to FIG. 8, the support leg portion 230 and the support leg frame 220 may be composited with each other such that a groove or gap G having a predetermined size exists between the upper surface 211 of the attachment portion 210 and the lower end 231 of the support leg portion 230 facing the upper surface 211 of the support leg portion 230. The size of the gap G may vary depending on the thickness of the winding thread 110, the application thickness of the adhesive, and so forth. The size of the gap G is set such that, when winding the winding thread 110 around the attachment portion 210, the winding thread 110 can be wound in the gap G. By way of example, the size of the gap G may be 2 mm or less. Due to the gap G, most of the entirety of the upper surface 211 of the attachment portion 210 is exposed. Thus, much winding thread 110 can be wound around the attachment portion 210 and the fishing line guide 200 can be more firmly attached to the fishing rod 100.

Figure 9:
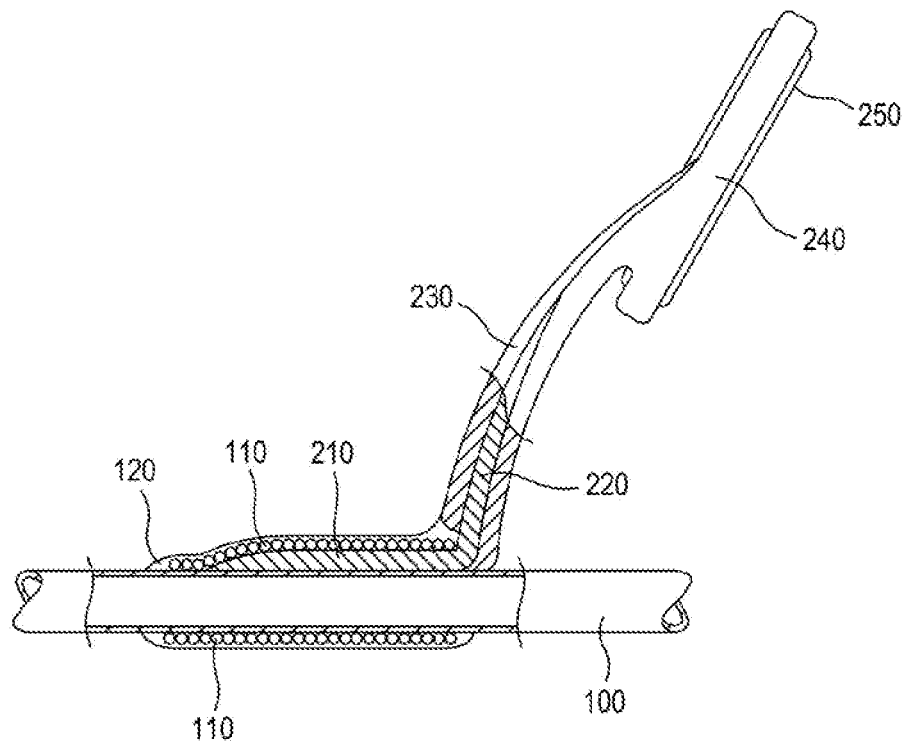
FIG. 9 is a longitudinal sectional view showing that a winding thread is wound around the fishing line guide shown in FIG. 8.

FIG. 8 illustrates that the surface of the support leg frame 220 is partially exposed through the gap G existing between the upper surface 211 of the attachment portion 210 and the lower end 231 of the support leg portion 230. However, the support leg portion 230 may be composited with the support leg frame 220 such that the gap G exists between the support leg portion and the upper surface 211 of the attachment portion 210 but the support leg frame 220 is not exposed through the gap G. FIG. 9 illustrates that the winding thread 110 is wound around the attachment portion 210 shown in FIG. 8. Referring to FIG. 9, if the adhesive is applied to the wound winding thread 110, then the adhesive fills in the gap G due to a surface tension or a capillary phenomenon, thus creating no step portion between the coating layer 120 and the support leg portion 230. Further, at the surface of the support leg frame 220 which is opposite to the surface of the support leg frame 220 at which the gap G exists, the support leg portion 230 partially or wholly comes into contact with the fishing rod 100. Thus, although the coating layer 120 is not formed around the overall circumference of the lower end of the support leg portion 230, a step portion is not created between the fishing rod 100 and the support leg portion 230 and the fishing line guide is not caught.

Figure 10:
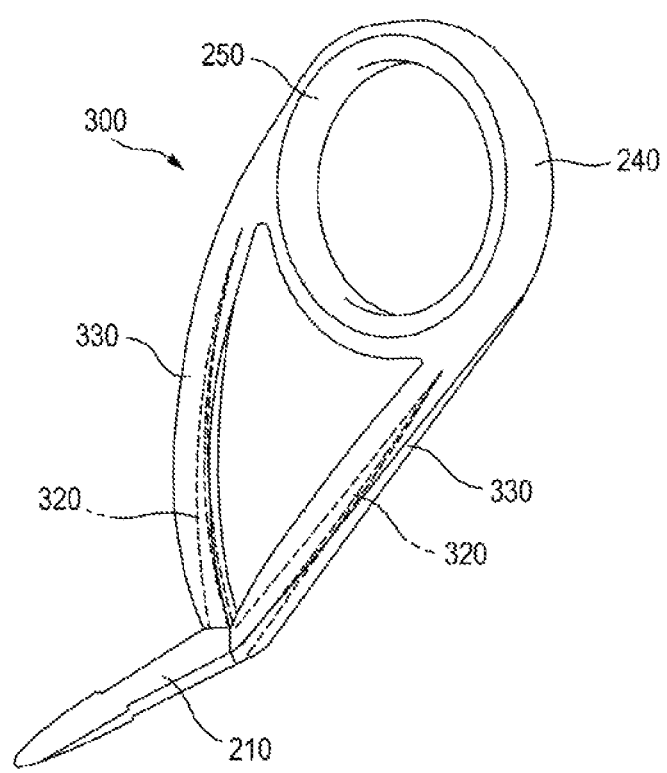
FIG. 10 is a perspective view showing a fishing line guide according to another embodiment.
Figure 11:
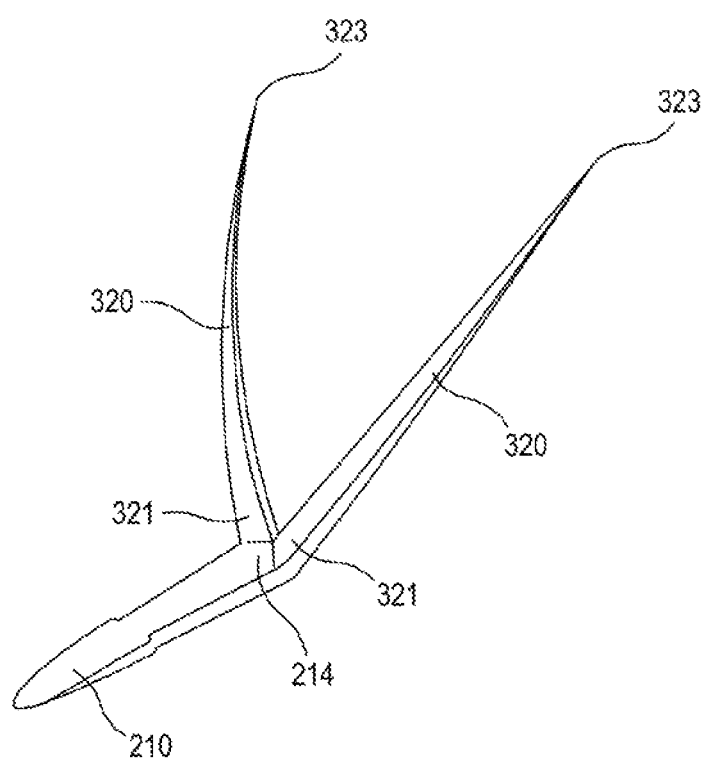
FIG. 11 is a perspective view showing an attachment portion and support leg frames of the fishing line guide shown in FIG. 10.

FIGS. 10 and 11 show a fishing line guide according to another embodiment. When comparing the fishing line guide 300 shown in FIG. 10 with the fishing line guide 200 of the above-described embodiment, the fishing line guide 300 is configured such that a base portion 321 of a support leg frame 320 is differently shaped and a lower end of a support leg portion 330 is differently shaped accordingly.

Referring to FIG. 11, the base portions 321 of the respective support leg frames 320 are not integrated together via a common portion, but are connected to the base end 214 of the attachment portion 210 respectively. Further, the respective support leg portions 330 may be composited with the respective support leg frames 320 such that the lower end facing toward the attachment portion 210 is in contact with or spaced apart from the upper surface of the attachment portion 210.

Figure 12:
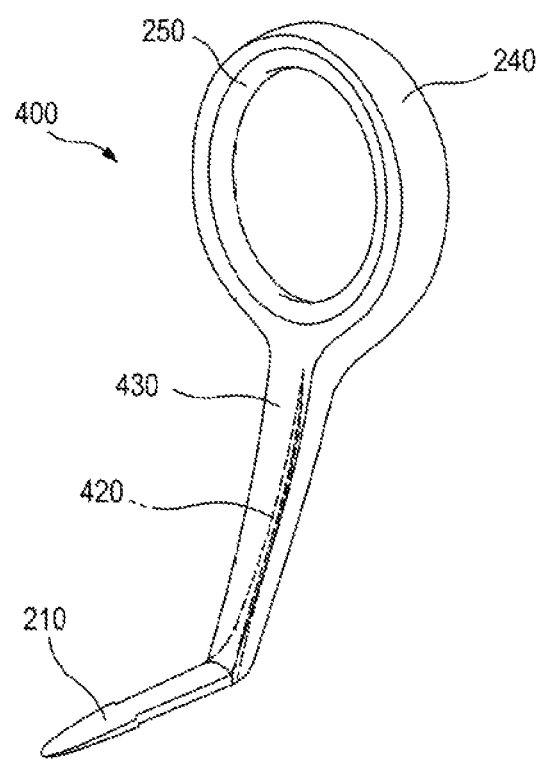
FIG. 12 is a perspective view showing a fishing line guide according to a further embodiment.
Figure 13:
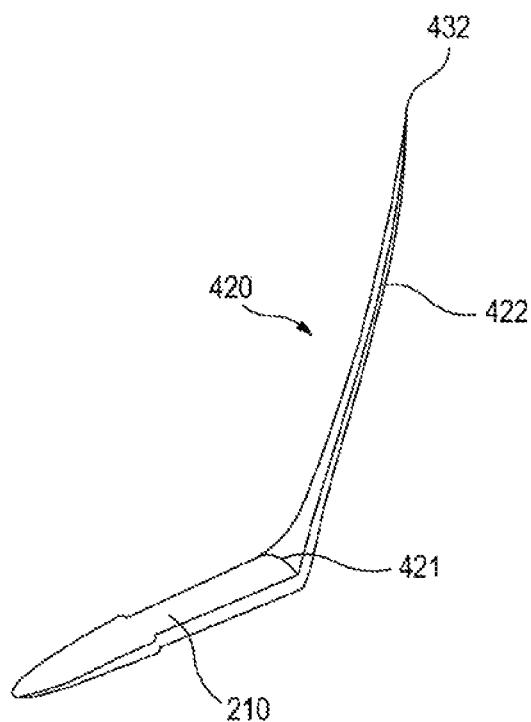
FIG. 13 is a perspective view showing an attachment portion and a support leg frame of the fishing line guide shown in FIG. 12.

FIGS. 12 and 13 showing a fishing line guide according to yet another embodiment. The fishing line guide 400 shown in FIG. 12 has the same configuration as the above-described fishing line guide 200 except that the fishing line guide 400 includes one support leg portion 430 and one support leg frame 420. The support leg frame 420 is joined to the base end of the attachment portion 210 at a base portion 421 thereof. The cross-sectional area of the support leg frame 420 gradually decreases from the base portion 421 toward a tip end 423.

Figure 14:
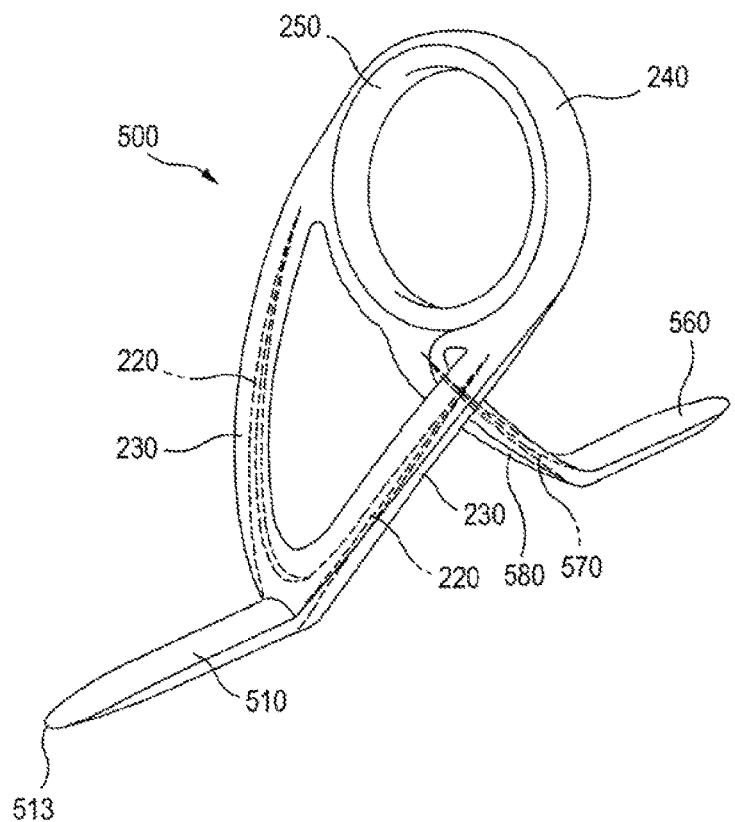
FIG. 14 is a perspective view showing a fishing line guide according to yet another embodiment.
Figure 15:
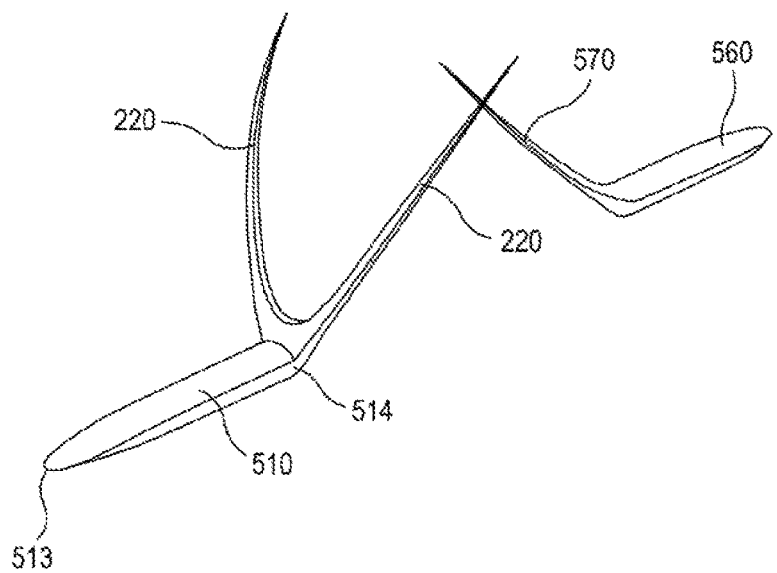
FIG. 15 is a perspective view showing an attachment portion, support leg frames, an auxiliary attachment portion and an auxiliary support leg frame of the fishing line guide shown in FIG. 14.

FIGS. 14 and 15 show a fishing line guide according to still another embodiment. The fishing line guide 500 shown in FIG. 14 has the same configuration as the above-described fishing line guide 200 except that the shape of the attachment portion is modified and that the fishing line guide further includes an auxiliary attachment portion, an auxiliary support leg frame and an auxiliary support leg portion.

Referring to FIGS. 14 and 15, the fishing line guide 500 in includes an auxiliary support leg portion 580 extending from the guide ring portion 240. The auxiliary support leg portion 580 is located opposite the support leg portion 230 with respect to the guide ring portion 240. When viewed from side, the angle between the support leg portion 230 and the auxiliary support leg portion 580 may be appropriately determined in view of the required strength of the fishing line guide 500. Further, for connection of the auxiliary support leg portion 580 to the fishing rod, the fishing line guide further includes an auxiliary attachment portion 560 and an auxiliary support leg frame 570 integrally extending from a base end of the auxiliary attachment portion 560. The auxiliary support leg portion 580 is composited with the auxiliary support leg frame 570 throughout at least the overall length of the auxiliary support leg frame 570. The composition type for the auxiliary support leg frame 570 and the auxiliary support leg portion 580 is the same as the composition type of the above-described fishing line guide 200. Further, the cross-sectional shape of the auxiliary support leg frame 570 and the configuration of the tip end of the auxiliary support leg frame 570 are the same as those of the support leg frame 220 of the fishing line guide 200. Further, the support leg frame 420 and the support leg portion 430, which are described with reference to FIGS. 12 and 13, may be employed as the auxiliary support leg frame 570 and the auxiliary support leg portion 580.

As to the above-described fishing line guide 200, 300, 400 or 500, a combination of the attachment portion 210 or 510 and the support leg frame 220, 320 or 420 is formed first and then the support leg portion 230, 330 or 430 and the guide ring portion 240 are formed.

The combination wherein the attachment portion 210 or 510 and the support leg frame 220, 320 or 420 are integrated together may be formed by pressing. Further, the tip end portion of the attachment portion 210 or 510 may be formed sharp and thin by cutting. To form the support leg portion 230, 330 or 430 and the guide ring portion 240 by means of the aforementioned combination may be performed by insert molding. By way of example, the support leg portion 230, 330 or 430, which is composited throughout at least the overall length of the support leg frame 220, 320 or 420 up to the attachment portion 210 or 510, and the guide ring portion 240, which is formed on the support leg portion, may be obtained through the following: the support leg frame 220, 320 or 420 of the aforementioned combination is disposed in a mold having the shape of the support leg portion 230, 330 or 430 and the guide ring portion 240; molten liquid of a thermoplastic fiber-reinforced plastic or other thermoplastic is injected into the mold; and molding is performed.

Figure 16B:
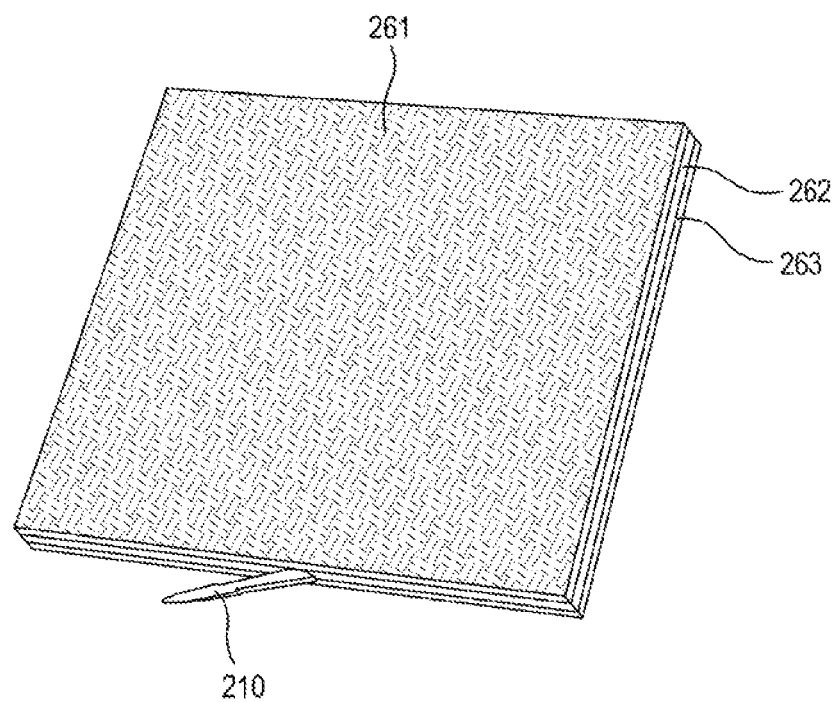
FIG. 16B is a second view schematically showing a laminate molding method of resin pre-impregnated materials for a fishing line guide according to one embodiment.
Figure 16C:
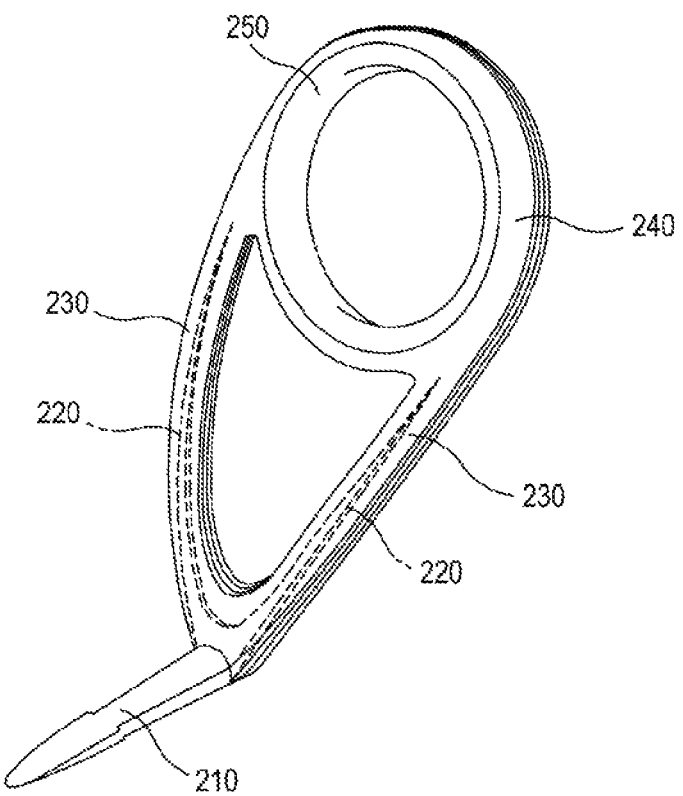
FIG. 16C is a third view schematically showing a laminate molding method of resin pre-impregnated materials for a fishing line guide according to one embodiment.
Figure 17A:
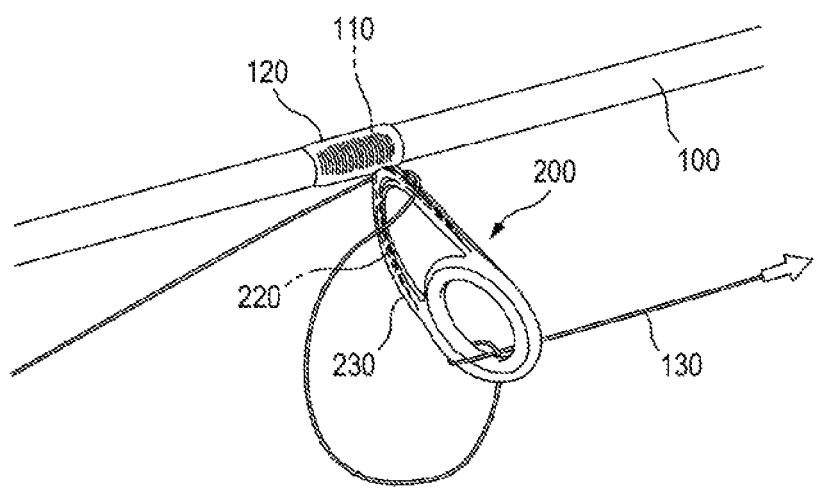
FIG. 17A is a first view showing an example of a fishing line guide according to one embodiment which has a support leg portion structure allowing the fishing line entanglement in the fishing line guide to be disentangled during casting.
Figure 17D:
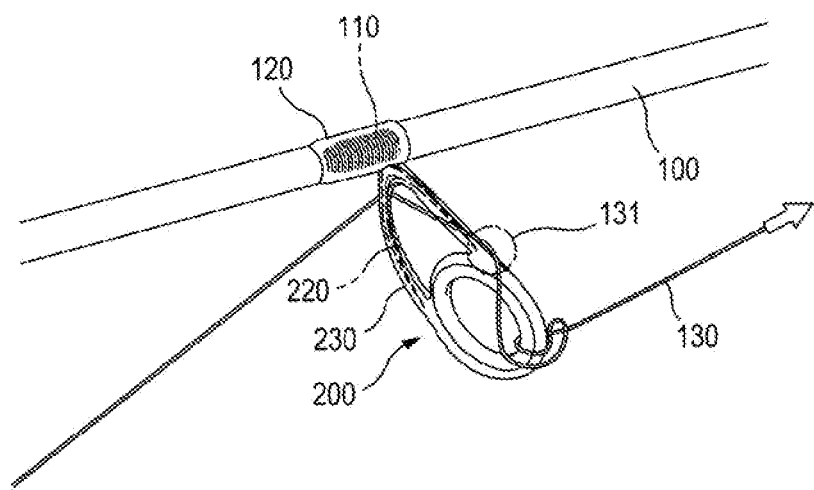
FIG. 17D is a fourth view showing an example of a fishing line guide according to one embodiment which has a support leg portion structure allowing the fishing entanglement in the fishing line guide to be disentangled during casting.
Figure 17E:
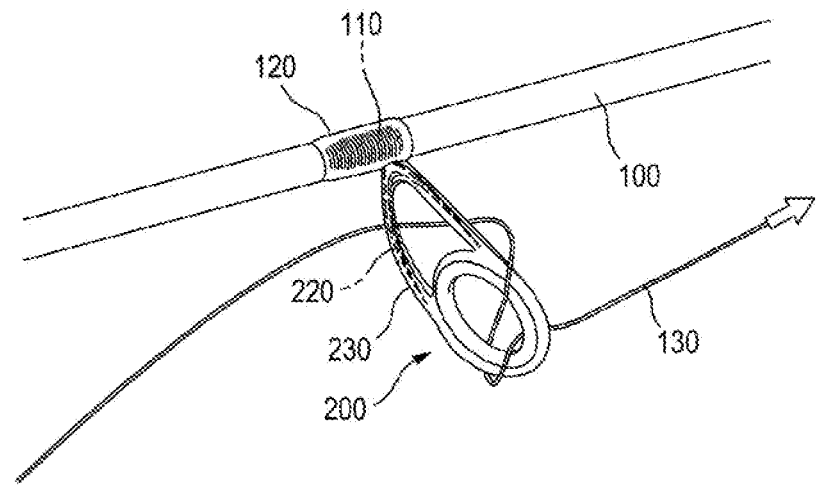
FIG. 17E is a fifth view showing an example of a fishing line guide according to one embodiment which has a support leg portion structure allowing the fishing line entanglement in the fishing line guide to be disentangled during casting.

Said forming the support leg portion 230, 330 or 430 and the guide ring portion 240 by means of the aforementioned combination may be performed by prepreg laminate molding, i.e. laminate molding of resin pre-impregnated material. FIGS. 16A to 16C illustrate that the support leg portion and the guide ring portion are fabricated by laminate molding of resin pre-impregnated material. As shown in FIG. 16A, the support leg portions which are composited with the support leg frames 220, can be obtained by inserting the support leg frames 220 of the aforementioned combination in between a plurality of resin pre-impregnated materials 261, 262 and 263 and then compressing the resin pre-impregnated materials. The fishing line guide 200 can be obtained by cutting or grinding the laminated resin pre-impregnated materials in conformity with the shape of the fishing line guide 200. The fishing line guide 200 finished by cutting or grinding is shown in FIG. 16C. In the example shown in FIG. 16A, three resin pre-impregnated materials 261, 262 and 263 are used and an intermediate resin pre-impregnated material 262 is formed with a V-shaped cutout 264 which corresponds to the shape of the support leg frames 220.

One example of the characteristic shape, which disentangles the entanglement of the fishing line in the fishing line guide 200 according to the above-described embodiment, is shown in FIGS. 7A to 17E. The fishing line, which passes through the guide ring portion of the fishing line guide immediately after casting, may be wound and entangled with the guide ring portion. In this regard, Korean Patent Registration Publication No. 10-1132437 describes, in paragraph [00041], the phenomenon of such entanglement. FIGS. 17A to 17E sequentially show that a folded portion 131, which the fishing line 130 makes around the fishing line guide 200, smoothly moves to disentangle the entanglement of the fishing line when the fishing line 130 is wound and entangled with the guide ring portion during a fishing rig.

In the fishing line guide 200, since the support leg portions 230 are composited with the support leg frames 220 throughout at least the overall length of the support leg frames 220, the support leg frames 220 and the support leg portions 230 are smoothly formed without any step portion in the longitudinal direction. Accordingly, although the entanglement of the fishing line 130 occurs at the guide ring portion of the fishing line guide 200 (see FIGS. 17A and 17B), the folded portion 131 of the fishing line 130 is smoothly moved along the support leg portion 230 along with being pulled of the fishing line 130 in the approximately longitudinal direction of the fishing rod 100, thus easily disentangling the entanglement of fishing line (see FIGS. 17C to 17E).

Further, to facilitate the disentanglement of the entangled fishing line, when the fishing line guide 200 is attached to the fishing rod 100, it is preferable that the guide ring portion 240 is inclined toward the tip of the fishing rod 100 (toward the right side in FIG. 7) and that a join angle between the guide ring portion 240 and the support leg portion 230 toward the butt of the fishing rod is less than a join angle between the guide ring portion and the support leg portion toward the tip of the fishing rod, as shown in FIG. 7.

Other examples of the entanglement of the fishing line other than the aforementioned example may exist. The entanglement of the fishing line is disentangled as the fishing line slides and moves along the surface of the fishing line guide 200. Therefore, it is important with regard to the disentanglement of the entangled fishing line that the support leg frames 220 and the support leg portions 230 are smoothly formed without any step portion in the longitudinal direction.

Figure 18A:
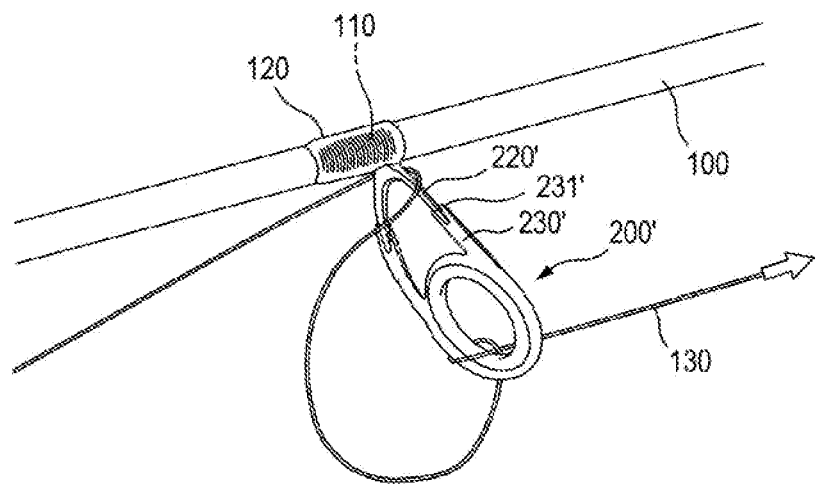
FIG. 18A is a first view showing an example of a fishing line guide which has a support leg portion structure failing to disentangle the fishing line entanglement.
Figure 18B:
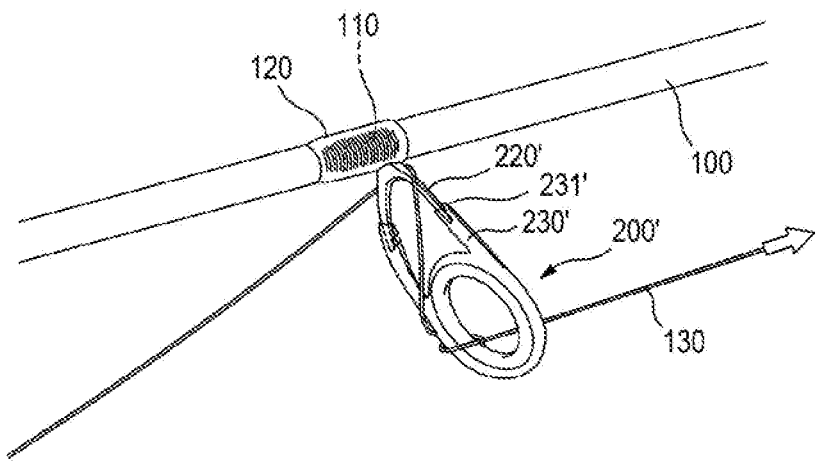
FIG. 18B is a second view showing an example of a fishing line guide which has a support leg portion structure failing to disentangle the fishing line entanglement.
Figure 18C:
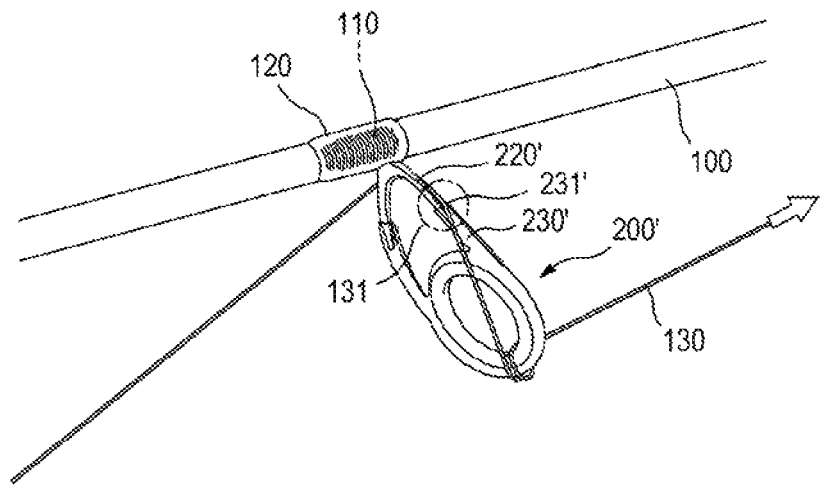
FIG. 18C is a third view showing an example of a fishing line guide which has a support leg portion structure failing to disentangle the fishing line entanglement.

To compare with the disentanglement of the entangled fishing line, which is achieved through the smooth movement of the folded portion 131 of the fishing line 130 as shown in FIGS. 17A to 17E, FIGS. 18A to FIG. 18C show an example wherein an entangled fishing line is not disentangled in a fishing line guide according to a comparative example. Referring to FIGS. 18A to 18C, in case of the fishing line guide 200' according to a comparative example, support leg portions 230' are not composited with support leg frames 220' throughout the overall length of the support leg frames 220'. Thus, the support leg frames 220' are exposed throughout the considerable length thereof and the lower ends 231' of the support leg portions 230' facing toward the attachment portion serve as a step portion in the longitudinal direction between the support leg portions 230' and the support leg frames 220'. Thus, the folded portion 131, which is formed around the support leg frames 220' during casting of fishing, is caught by the lower end 231' which serves as the step portion (see FIG. 18C). Consequently, when the fishing line 130 is pulled in the longitudinal direction of the fishing rod 100, the folded portion 131 of the fishing line 130 is not pulled up and thus the entanglement of the fishing line is not easily disentangled.

Figure 19:
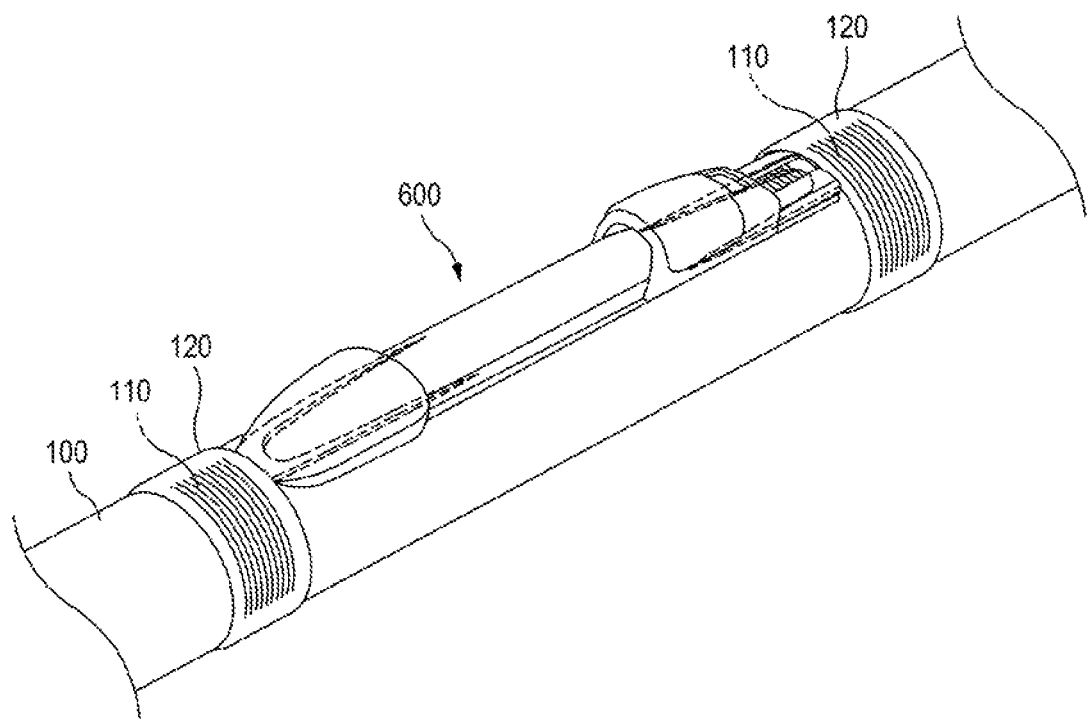
FIG. 19 is a perspective view showing a fishing rod to which a reel seat according to one embodiment of the present invention is attached.

FIG. 19 illustrates that another fishing rod part according to the present invention is attached to the fishing rod. In FIG. 19, a reel seat 600, which is another example of the fishing rod part, is attached to the fishing rod 100. The reel seat 600 is attached to the fishing rod 100 by bringing the attachment portions located at the opposite ends of the reel seat into contact with the fishing rod 100 and closely winding the winding thread 110 around the attachment portions. After the attachment of the reel seat 600, the adhesive is applied on the portion around which the winding thread 110 is wound, thereby forming the coating layer 120 which covers the portion around which the winding thread 110 is wound.

Figure 20:
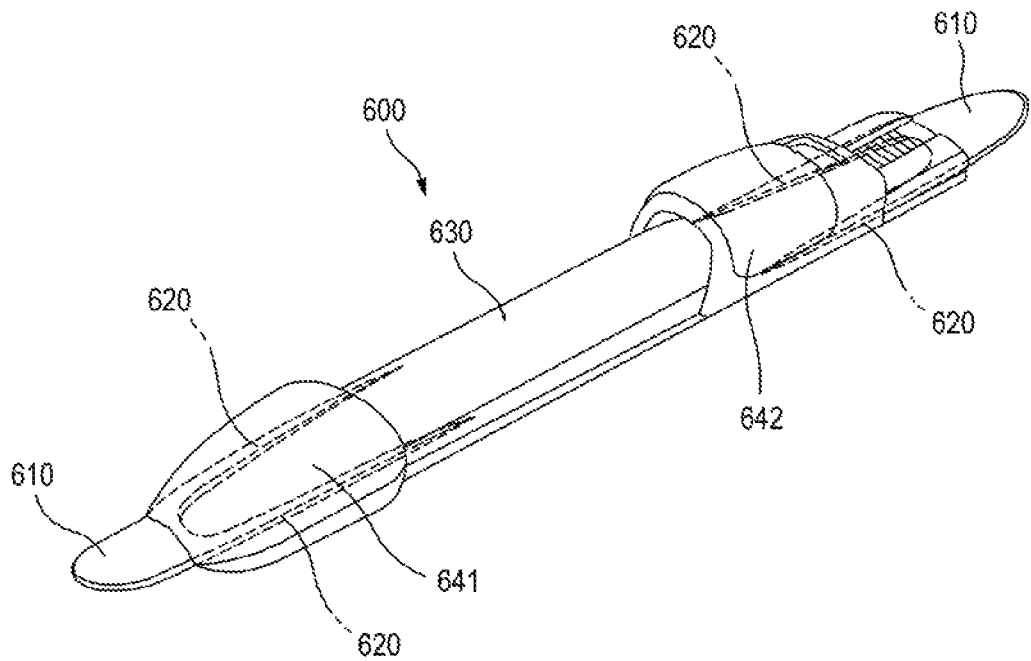
FIG. 20 is a perspective view showing a reel seat according to one embodiment of the present invention.
Figure 21:
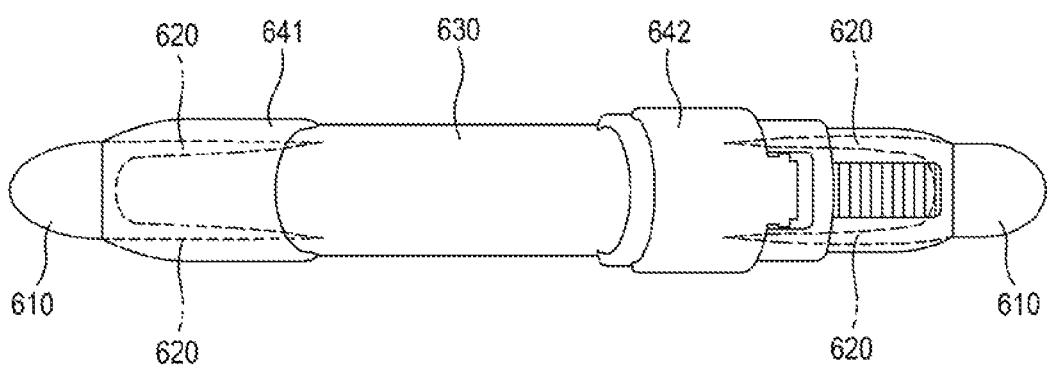
FIG. 21 is a top view of the reel seat shown in FIG. 20.
Figure 22:
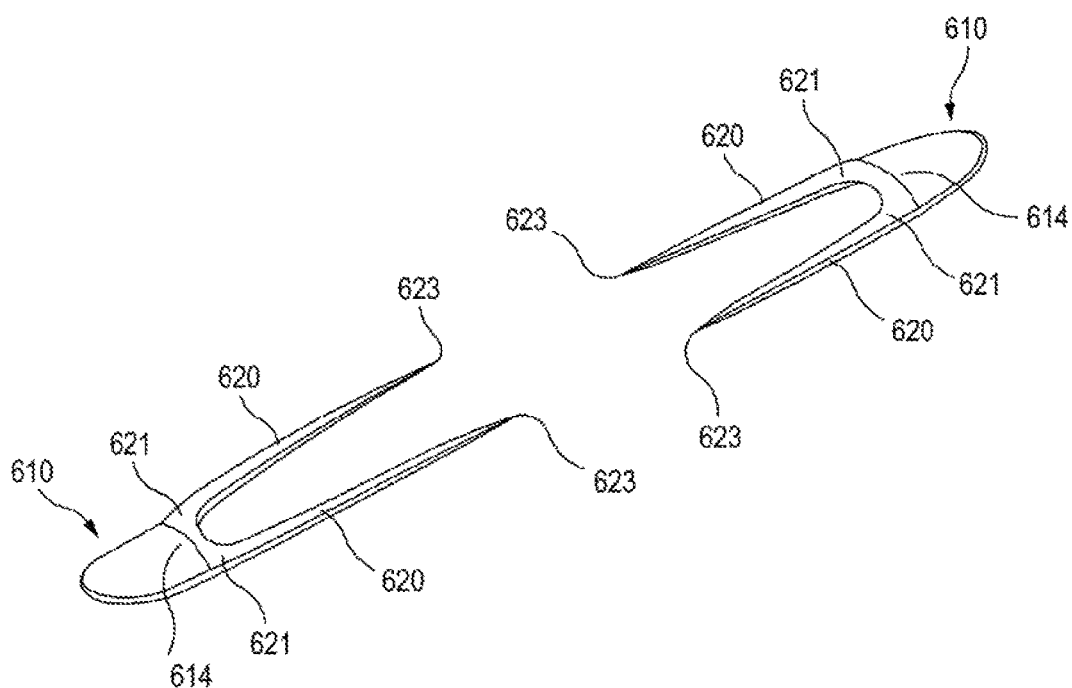
FIG. 22 is a perspective view showing attachment portions and support leg frames of the reel seat shown in FIG. 20.
Figure 23A:
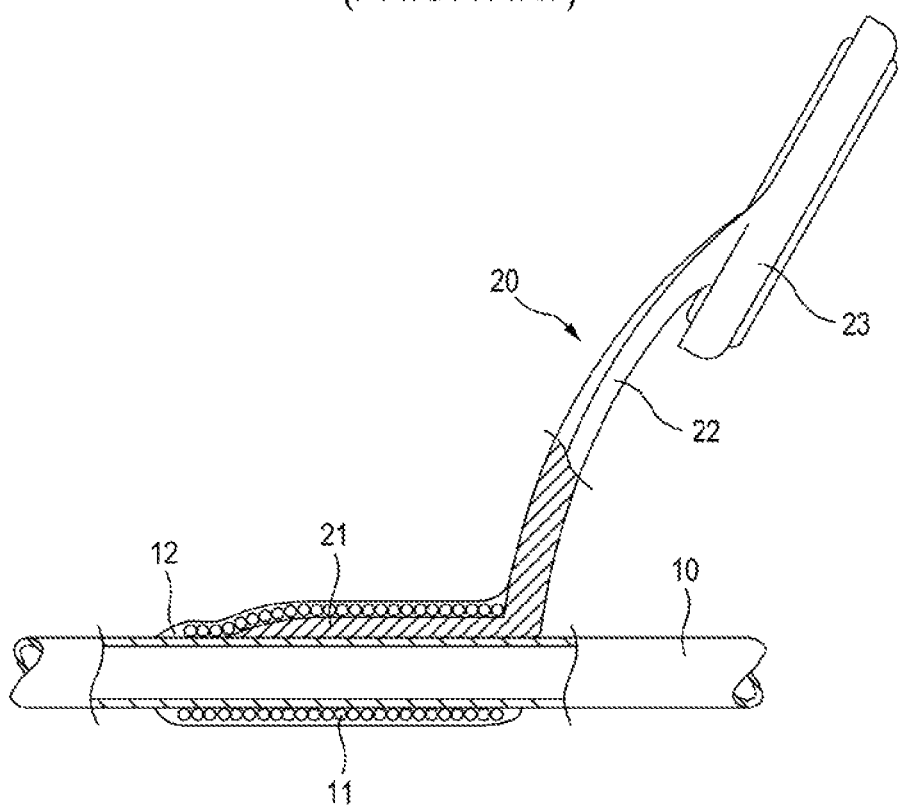
FIG. 23A is a first longitudinal sectional view showing a fishing line guide of a prior art.
Figure 23B:
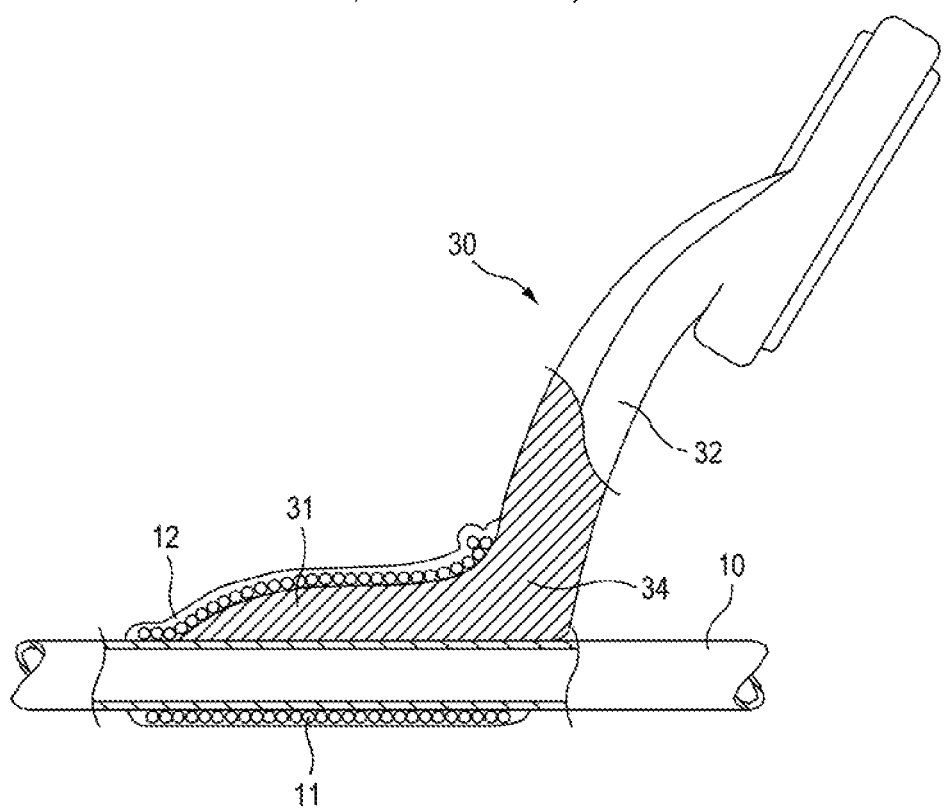
FIG. 23B is a second longitudinal sectional view showing a fishing line guide of a prior art.

FIGS. 20 to 22 show the reel seat shown in FIG. 19 in detail. The reel seat 600 according to one embodiment includes attachment portions 610 and support leg frames 620 which are configured similar to the attachment portion 210 and the support leg frame 220 of the above-described fishing line guide 200. Further, the reel seat 600 includes; a seat body 630, which is composited with the support leg frames 620 throughout at least the overall length of the support leg frames 620; and a fixed holder 641 and a movable holder 642 coupled to the seat body 630. The movable holder 642 is movable toward or away from the fixed holder 641 along the seat body 630. A reel (not shown) is mounted on the seat body 630 between the fixed holder 641 and the movable holder 642.

Similar to the combination of the attachment portion 210 and the support leg frame 220 of the above-described fishing line guide 200, the attachment portion 410 and the support leg frame 620 are integrally formed and are made of a metallic material. The support leg frame 620 extends in a U-like shape from a base end 614 of the attachment portion 610. The attachment portion 210 or 510 and the support leg frame 220, 320 or 420 of the above-described fishing line guides 200, 300, 400 and 500 may be used as the attachment portion 610 and the support leg frame 620 of the reel seat 600.

In this embodiment, a pair of combinations of the attachment portion 610 and the support leg frame 620 are coupled to the seat body 630. The combinations of the attachment portion 610 and the support kg frame 620 are disposed at the longitudinal opposite ends of the seat body 630. The seat body 630 is composited with the support leg frames 620 throughout predetermined sections from its either end toward inside. The seat body 430 is made of a fiber-reinforced plastic or other plastic material having superior moldability. The metallic material which forms the attachment portion 210 and the support leg frame 220 of the above-described fishing line guide 200 may be employed as a metallic material for forming the combination of the attachment portion 610 and the support leg frame 620. Further, the plastic material which is employed for the support leg portion 230 of the above-described fishing line guide 200 may be employed as a plastic material which is employed for the seat body 630. The seat body 630 of the reel seat 600 may be formed by the following; forming the combinations of the attachment portion 610 and the support leg frame 620 and then performing the above-described insert molding or laminate molding of resin pre-impregnated material on the support leg frames 620 of the combinations.

In the reel seat 600 according to the embodiment, the attachment portions 610, which are attached to the fishing rod 100, and the support leg frames 620, which extend from the attachment portion 610, are made of a metallic material and thus has superior workability. The seat body 630 is made of a plastic material, thus achieving weight reduction.

The present invention described heretofore should not be limited to the above-described embodiments and the accompanying drawings. For example, while the fishing rod part is attached to the fishing rod by means of the winding thread wound around the attachment portion in the above-described embodiments and the accompanying drawings, the means for attaching the fishing rod part to the fishing rod is not limited thereto. The fishing rod part may be attached to the fishing rod using an adhesive tape (e.g., a polyester sticky tape) wound around the attachment portion or a rubber tube to which the attachment portion is inserted. Further, it will be apparent to those of ordinary skill in the technical field to which the present invention pertains, that various substitutions, modifications and alternations may be made without departing from the technical idea of the present invention.

DESCRIPTION OF REFERENCE SYMBOLS 100 fishing rod, 110 winding thread, 120 coating layer, 130 fishing line, 200, 300, 400, 500 fishing line guide, 210, 510 attachment portion, 211 upper surface, 212 lower surface, 213 tip end, 214 base end, 215 tip end portion, 220, 320, 420 support leg frame, 221, 321, 421 base portion, 222, 422 intermediate portion, 223, 323, 423 tip end, 230, 330, 430 support leg portion, 231 lower end facing toward attachment portion, 240 guide ring portion, 250 hard ring, 261, 262, 263 resin pre-impregnated material, 264 cutout, 560 auxiliary attachment portion, 570 auxiliary support leg frame, 580 auxiliary support leg portion, 600 reel seat, 610 attachment portion, 614 base end, 620 support leg frame, 621 base portion, 623 tip end, 630 seat body, 641 fixed bolder, 642 movable holder

What is claimed is:

1. A reel seat, comprising:
    an attachment portion having a tip end and a base end and contacting a fishing rod, a winding thread being wound around the attachment portion;
    a support leg frame extending from the base end of the attachment portion and integrally formed with the attachment portion; and
    a seat body extending from the base end of the attachment portion and composited with the support leg frame throughout at least an overall length of the support leg frame,
    wherein the attachment portion and the support leg frame are made of a metallic material,
    wherein the seat body is partially or wholly made of a plastic material, and
    wherein a sectional area of at least a portion of the support leg frame gradually decreases toward a tip end of the support leg frame.

2. A fishing rod including the reel seat of claim 1.

3. The reel seat of claim 1, wherein the support leg frame comprises a pair of support leg frames extending from the base end of the attachment portion, and
    wherein respective base portions of the pair of the support leg frames, which are connected to the base end of the attachment portion, are integrally formed via a common portion.

4. The reel seat of claim 1, wherein the support leg frame has an intermediate portion having a constant sectional area, and a sectional area of the support leg frame gradually decreases from the intermediate portion toward the tip end of the support leg frame.

5. The reel seat of claim 1, wherein the support leg frame has at least one concave portion for fixing the seat body.

6. A fishing rod including the reel seat of claim 3.

7. A fishing rod including the reel seat of claim 4.

8. A fishing rod including the reel seat of claim 5.

* * * * *